US012796616B2

(12) United States Patent
Van Der Vegte et al.

(10) Patent No.: US 12,796,616 B2
(45) Date of Patent: Nov. 17, 2026

(54) CUTTER DEVICE FOR AN AGRICULTURAL HARVESTER

(71) Applicant: Kuhn-Geldrop B.V., Geldrop (NL)

(72) Inventors: Bernardus Gerhardus Johannes Van Der Vegte, Nuenen (NL); Johannes Antonius Martinus Van Gog, Soerendonk (NL)

(73) Assignee: Kuhn-Geldrop B.V., Geldrop (NL)

( * ) Notice: Subject to any disclaimer, the term of this patent is extended or adjusted under 35 U.S.C. 154(b) by 363 days.

(21) Appl. No.: 18/539,836

(22) Filed: Dec. 14, 2023

(65) Prior Publication Data

US 2024/0196804 A1 Jun. 20, 2024

(30) Foreign Application Priority Data

Dec. 14, 2022 (GB) ...................................... 2218840
Jun. 1, 2023 (GB) ...................................... 2308217
Jun. 9, 2023 (GB) ...................................... 2308649

(51) Int. Cl.
*A01D 90/04* (2006.01)
*A01D 89/00* (2006.01)
(Continued)

(52) U.S. Cl.
CPC ............ *A01D 90/04* (2013.01); *A01F 15/106* (2013.01); *A01F 29/025* (2013.01); *A01D 89/001* (2013.01); *A01F 2015/107* (2013.01)

(58) Field of Classification Search
CPC .................. A01F 15/106; A01F 29/025; A01F 2015/107; A01D 90/00
See application file for complete search history.

(56) References Cited

U.S. PATENT DOCUMENTS 6,912,835 B1 7/2005 Chabassier
9,468,149 B2 * 10/2016 Derscheid .............. A01F 29/04
(Continued)

FOREIGN PATENT DOCUMENTS

CN 217608451 U 10/2022
DE 38 21 717 A1 1/1990
(Continued)

OTHER PUBLICATIONS

English translate (DE102019005926A1), retrieved date Jan. 18, 2026.*
(Continued)

*Primary Examiner* — Mohammed S. Alawadi
(74) *Attorney, Agent, or Firm* — Oblon, McClelland, Maier & Neustadt, L.L.P.

(57) ABSTRACT

A cutter device for an agricultural harvester, including: a rotor with a plurality of tines; a sub-assembly including a pivot shaft, a knife, and a first bottom plate located beneath the rotor in a working condition; a support frame; a positioning device mounted to the support frame, and a control mechanism mounted to the support frame. The sub-assembly is moveably mounted to the support frame and is arranged to move relative to the support frame in a lateral direction that is transverse to the forward moving direction of the cutter device between i) a working position in which the sub-assembly is aligned with the support frame in a manner that enables the knife to be engageable by the positioning device, and ii) a maintenance position in which the knife is laterally spaced apart from the positioning device and the sub-assembly protrudes laterally outwards from the support frame.

34 Claims, 23 Drawing Sheets

(51) Int. Cl.
*A01F 15/10* (2006.01)
*A01F 29/02* (2006.01)

(56) References Cited

U.S. PATENT DOCUMENTS

| | | | | |
|---|---|---|---|---|
| 2008/0028737 | A1 | 2/2008 | Viaud et al. | |
| 2016/0029567 | A1 | 2/2016 | Meiners | |
| 2016/0219789 | A1 | 8/2016 | Derscheid et al. | |
| 2020/0093068 | A1* | 3/2020 | Claeys | A01F 15/10 |

FOREIGN PATENT DOCUMENTS

| | | | | |
|---|---|---|---|---|
| DE | 93 08 656 | U1 | 8/1993 | |
| DE | 199 52 463 | A1 | 5/2001 | |
| DE | 10 2012 003 016 | B3 | 8/2013 | |
| DE | 102019005926 | A1 * | 9/2020 | A01D 90/04 |
| EP | 0 284 792 | A1 | 10/1998 | |
| EP | 2 659 762 | A1 | 11/2013 | |
| EP | 2 659 763 | A1 | 11/2013 | |
| EP | 3 053 430 | A1 | 8/2016 | |
| EP | 2 939 521 | B1 | 7/2017 | |
| EP | 3 729 953 | A1 | 10/2020 | |
| EP | 3 732 953 | A1 | 11/2020 | |
| EP | 3 959 961 | A1 | 3/2022 | |
| EP | 4 186 351 | A1 | 5/2023 | |
| EP | 4 374 682 | A1 | 5/2024 | |
| WO | WO 2014/129892 | A1 | 8/2014 | |

OTHER PUBLICATIONS

Extended European Search Report issued May 15, 2024, in corresponding European Patent Application No. 23216489.7, 5 pages.
Combined Search and Examination Report under Sections 17 & 18(3) issued Jun. 7, 2023, in corresponding United Kingdom Patent Application No. GB2218840.3, 2 pages.
Combined Search and Examination Report under Sections 17 & 18(3) issued Nov. 27, 2023, in corresponding United Kingdom Patent Application No. GB2308217.5, 2 pages.
Combined Search and Examination Report under Sections 17 & 18(3) issued Dec. 6, 2023, in corresponding United Kingdom Patent Application No. GB2308649.9, 2 pages.

* cited by examiner

CUTTER DEVICE FOR AN AGRICULTURAL HARVESTER

The present invention relates to a cutter device for an agricultural harvester, for example a round baler, a square baler or a loading wagon.

The invention also relates to an agricultural harvester comprising a crop pickup device, a crop receiving station and a cutter device, a method of accessing a knife from a cutter device of an agricultural.

The agricultural harvester may for example be a round baler of the fixed chamber or variable chamber type, examples of which are described in EP 3157321 and EP 3021659.

In the case of a round baler the crop receiving station may comprise the baling chamber in which crop material is rotated and pressed to make a round bale. Alternatively, the agricultural harvester may be a square baler, an example of which is described in EP 3038452 and the crop receiving station may in that case be the pre-chamber in which crop material is collected before being transferred to the baling chamber where it is compressed by a reciprocating plunger to form a square bale. Alternatively, the agricultural harvester may be a loading wagon, an example of which is described in DE 102013007304, in which the crop receiving station is a loading platform on which the crop material is gathered.

The purpose of the cutter device is to receive crop material from the pickup device and transport the crop material along the feed path to the crop receiving station. The cutter device is configured to cut the crop material when required for improved handling. For example, if the crop material is grass the cutter device may be configured to cut the stalks of the grass into shorter lengths. Cutting of the crop material is optional and the cutter device may be configured for either cutting or non-cutting operation.

Typically, the cutter device of an agricultural harvester comprises a rotating rotor consisting of a tube that carries a plurality of radially-extending tines. The tines of the rotating rotor carry the crop material forward along a feed path that is defined in part by a bottom plate. A plurality of knives extend upwards through slots in the bottom plate into the feed path of the crop material. The knives cooperate with the tines of the rotating rotor to cut the crop material. The knives may also optionally be withdrawn from the feed path and placed in a non-cutting position below the bottom plate so that the crop material is transferred by the rotor along the feed path without being cut. Optionally, some of the knives may be placed in the cutting position while others of the knives are held in the non-cutting position, to adjust the cut length of the crop material. A retainer device, for example comprising a comb, may be provided to remove crop material from the tines of the rotating rotor. The knives may be provided with an overload protection mechanism, that allows the knives to be pressed downwards against a resilient element from the cutting position towards the non-cutting position, for example when an obstacle such as a stone passes through the feed path. An example of a cutter device is described in WO 2011144349 A1. The knives may be provided with a control mechanism as to hold one or more knives in the cutting position. The position control mechanism can be provided with a selection device as to select a limited number of knives that will be brought from the non-cutting position into the cutting position. An example is for instance described in EP2110014A1.

An issue with known cutter devices is that they can be difficult to service. In particular, it can be difficult to access the cutter knives, for example to remove them for sharpening or to replace a knife if the knife is too badly damaged or worn. This problem has been addressed to some extent by EP2659761B1, which discloses a system wherein a sub-assembly can move relative to a cutter device frame, thereby providing access to the knives. However, the solution is not very pragmatic since the sub-assembly is very large and heavy, which means that the cutter frame must be very strong to support the sub-assembly to move in a lateral direction, and the large weight makes it difficult for a user to withdraw the sub-assembly, or a mechanism is required to withdraw the sub-assembly.

It is an object of the present invention to provide a cutter device for an agricultural harvester that overcomes or mitigates one or more of the aforesaid technical problems.

According to one aspect of the invention there is provided a cutter device according to claim 1. The invention enables a user to easily access the knife in order to perform maintenance on the knife or to replace the knife with a new knife. A significant advantage of the invention is that the sub-assembly does not include the positioning device and the control mechanism that controls operation of the positioning device and therefore the sub-assembly is relatively light and is easy to move, and is relatively compact so only a relatively small amount of space is required for receiving the sub-assembly.

An advantage of including the bottom plate in the moveable sub-assembly is that the end position is defined by the bottom plate, no extra parts are required to hold the knife in place, and there is no problem with catching dirt on those parts. Furthermore, there is no problem if the knife does not fall sufficiently deeply into the opening since the knife will still be moved to the maintenance position with the bottom plate. In prior art arrangements where the bottom plate stays in the machine, there is a common problem of crop materials sticking (grass sugars act as a glue) to the sides of the knives, so the knives do not fall through the slots.

Another advantage of the invention is that the bottom of the cutter device can comprise a plurality of adjacent plates to define the crop feed path. The sub-assembly typically includes only the bottom plate that includes the opening for the knife (or openings for the knives) thereby reducing the weight of the sub-assembly. Since the weight of the sub-assembly is relatively low for this arrangement the guiderails that support the sub-assembly can be less robust, of lower strength and/or lower weight.

According to another aspect there is provided a cutter device for an agricultural harvester.

The cutter device can include a rotor with a plurality of tines, wherein the rotor is rotatable to transfer an agricultural crop along a feed path.

The cutter device can include a sub-assembly. The sub-assembly is sometimes referred to as a cassette.

The sub-assembly can include a pivot shaft.

The sub-assembly can include a knife. The position of the knife can be adjustable between (i) a cutting position in the feed path in which it cooperates with the rotor to cut the crop, and (ii) a non-cutting position in which it is withdrawn from the feed path. The knife can include an engagement formation located towards a front end of the knife that is arranged to engage the pivot shaft.

The cutter device can include a bottom wall comprising a plurality of adjacent bottom plates. The bottom wall defines the crop feed path. A first bottom plate includes an opening through which the knife extends in the cutting position (or respective openings through which respective knives extend in their respective cutting positions). The sub-assembly can include the first bottom plate. In some embodiments, the sub-assembly can include at least one further bottom plate. However, it is preferred to only include the first bottom plate where possible to reduce the weight of the sub-assembly. The first bottom plate can be located beneath the rotor in a working condition. The crop feed path can be located between the rotor and the first bottom plate. The bottom wall can include a second bottom plate which is located in front of the first bottom plate in the crop material flow direction. The bottom wall can include a third bottom plate which is located behind the first bottom plate in the crop material flow direction.

The cutter device can include a support frame.

The support frame may be pivotably mounted to the frame of the agricultural harvester.

The cutter device can include a positioning device. The positioning device can be mounted to the support frame. The positioning device can be arranged to control movement of the knife between the cutting position and the non-cutting position. The positioning device can be arranged to selectively disengage the knife to allow movement of the knife relative to the positioning device.

The cutter device can include a control mechanism. The control mechanism can be mounted to the support frame. The control mechanism can be arranged to control movement of the positioning device.

The sub-assembly can be moveably mounted to the support frame in a manner that enables the sub-assembly to move relative to the support frame in a lateral direction. The lateral direction can be transverse to the forward moving direction of the cutter device, when the cutter device is in use. The lateral direction can be generally in the longitudinal orientation of the pivot shaft. The sub-assembly can be arranged to move between i) a working position in which the sub-assembly is aligned with the support frame in a manner that enables the knife to be engageable by the positioning device, and ii) a maintenance position in which the knife is laterally spaced apart from the positioning device and the sub-assembly protrudes laterally outwards from the support frame.

The support frame can include a first guide rail. The sub-assembly can be arranged to move relative to first guide rail.

The cutter device can include a first roller element for guiding movement of the sub-assembly relative to the first guide rail. The first roller element can be mounted to one of the sub-assembly and the support frame, and preferably is mounted to the support frame. The cutter device can include a plurality of first roller elements.

The cutter device can include at least one first guide element that is arranged to guide movement of the sub-assembly relative to the first guide rail. The at least one first guide element can be arranged to engage the first guide rail.

The sub-assembly can include a first support member. The first support member can be elongate. The first support member can be mounted adjacent a first longitudinal edge of the first bottom plate. The first support can be mounted on an underside of the first bottom plate. This provides a compact arrangement. The first support member can be arranged parallel with the first rail. The first support member can have a length that is greater than the length of the first bottom plate.

The at least one first guide element can be mounted on the first support member. The cutter device can include a plurality of first guide elements. Typically each of the first guide elements is mounted on the first support member. The first guide element can be arranged to support the sub-assembly in/on the first guide rail when the sub-assembly is in the working position. The effect of this is to release the forces on the guide rollers in working position, that is, the guide rollers are not loaded by the sub-assembly in the working position. In some embodiments, the first guide element comprises a passive slide element, for example a block of material.

The first roller element can be arranged to engage the first support member. The first roller element can be arranged to support the sub-assembly when the sub-assembly moves laterally relative to the support frame.

The support frame can include a second guide rail and the sub-assembly is arranged to move relative the second guide rail.

The cutter device can include a second roller element for guiding movement of the sub-assembly relative to the second guide rail. The second roller element can be mounted to one of the sub-assembly and the support frame, and preferably is mounted to the support frame. The cutter device can include a plurality of second roller elements.

The cutter device can include at least one second guide element that is arranged to guide movement of the sub-assembly relative to the second guide rail. The at least one second guide element can be arranged to engage the second guide rail.

The sub-assembly can include a second support member. The second support member can be elongate. The second support member can be mounted adjacent a second longitudinal edge of the first bottom plate. The second support can be mounted on an underside of the first bottom plate. This provides a compact arrangement. The second support member can have a length that is greater than the length of the first bottom plate.

The at least one second guide element can be mounted on the second support member. The cutter device can include a plurality of second guide elements. Typically each of the second guide elements is mounted on the second support member. The second guide element can be arranged to support the sub-assembly in/on the second guide rail when the sub-assembly is in the working position. In some embodiments, the second guide element comprises a passive slide element, for example a block of material.

The second roller element can be arranged to engage the second support member. The second roller element can be arranged to support the sub-assembly when the sub-assembly moves laterally relative to the support frame.

The first guide rail can be a rear guide rail that is positioned behind the knife and its opening in the first bottom plate, to enable crop material to freely through at least the rearward ⅔rds of the length of the opening to enable the knife to fall sufficiently deeply through the opening to enable the sub-assembly to move laterally.

The second guide rail can comprise a front guide rail.

In some embodiments the knife engagement formation engaging the pivot shaft, and any contact with the first bottom plate, are the only means of supporting the knife vertically while the sub-assembly moves laterally relative to the support frame. In some embodiments there are no other supports/combs that will support the knife during the lateral shifting, this to prevent any dirt from building up on those supporting elements.

The cutter device can include a locking device. The locking device can be arranged to fix the position of the sub-assembly with respect to the support frame. The locking device can be arranged to engage and disengage the sub-assembly with the first and/or second roller elements.

The locking device can be arranged to fix the position of the sub-assembly with respect to the support frame in the working position. This prevents accidental decoupling of the sub-assembly from the support frame during operation of the cutter device and helps ensure correct positioning of the knife relative to the positioning device (or respective knives relative to respective positioning devices) in the working position.

The locking device can comprise a pivotable locking handle which is arranged to selectively engage a locking formation to lock the position of the sub-assembly with respect to the support frame. One of the locking handle and the locking formation can be mounted on the sub-assembly and the other one of the locking handle and the locking formation can be mounted to the support frame. Preferably, the locking formation is attached to the support frame and the locking handle is mounted on the sub-assembly. The locking formation can comprise a locking pin. The locking handle can include a formation that is arranged to engage the locking formation. The locking handle formation can comprise a slot. The slot can be formed in a first end of the locking handle.

The locking handle in cooperation with the locking formation on the cutting unit frame can be arranged to, in response to actuation of the locking handle, provide a sufficiently large component of force on the sub-assembly to cause the sub-assembly to move in the lateral direction. The arrangement initiates movement of the sub-assembly by means of the mechanical advantage of the locking handle. For example, the locking handle can comprise a pivotable lever, which is pivotable about a pivot pin. The pivot pin can act as a fulcrum. The pivot pin can be located towards the first end of the locking handle, wherein the handle can be arranged for a user to grip the handle towards a second end of the handle, thereby providing a relatively large levering effect. The locking handle in cooperation with the locking formation on the cutting unit frame can be arranged to, in response to actuation of the locking handle, move the sub-assembly on and/or off the guide elements and place the sub-assembly into engagement with the rollers. When the sub-assembly is engaged with the rollers sub-assembly can be pulled out of the working position with more ease by a user.

In some embodiments, at least one of the guide elements can lose contact with its respective support rail, at least in a vertical direction, in response to the locking handle unlocking the sub-assembly from the support frame. In some embodiments, a plurality of guide elements can lose contact with their respective support rails, at least in a vertical direction, in response to the locking handle unlocking the sub-assembly from the support frame.

In embodiments wherein the locking handle comprises a lever, the lever can be arranged to provide a mechanical advantage, the arrangement being such that the locking handle is arranged to deliver an output force to the sub-assembly that is sufficiently large to move the sub-assembly laterally relative to the support frame and to engage the sub-assembly with the roller elements.

The locking position of the sub-assembly can be adjustable, for example by means of an adjustment mechanism, with respect to at least one of the cutting rotor and the positioning device. This helps to ensure that the knife is properly aligned with the cutting rotor and/or the positioning device.

The locking handle can be adjustable, by means of the adjustment mechanism, to adjust the locking position of the sub-assembly with respect to at least one of the cutting rotor and the positioning device.

The position of the locking handle pivot pin with respect to the support frame can be adjustable, by means of the adjustment mechanism, to adjust the locking position of the sub-assembly with respect to at least one of the cutting rotor and the positioning device.

The cutter device can include a latching arrangement for locking the position of the locking handle. The latching arrangement provides an extra layer of safety by preventing the locking handle from accidently moving. For example, the cutter device can include a latch. The cutter device can include a latching member. The cutter device can include a spring. The latch can be pivotable about a pivot pin and is arranged to selectively engage the latching member. The latching member can be located on the locking handle. The spring can be arranged to bias the latch towards engagement with the latching member, to hold the latch in engagement with the latching member. When the latch engages the latching member, the locking handle is locked in place and cannot be pivoted about its pivot pin. Thus the latching arrangement is arranged to prevent the locking handle from accidently disengaging the locking formation, for example when the sub-assembly is in the working position.

The pivot shaft and the knife can have complementary locking formations that lock the knife to the pivot shaft in a first configuration and allow separation of the knife from the pivot shaft in a second configuration.

The pivot shaft and the knife can be adjustable between the first configuration and the second configuration by relative rotation of the knife and the pivot shaft. The sub-assembly can include a handle for rotating the pivot shaft.

The positioning device can be configured to engage the knife at a location towards a rear part of the knife.

The positioning device and the knife can have complementary engaging formations configured to maintain engagement between the positioning device and the knife in a first position in which the knife can be located in the cutting position and all intermediate positions in between the first and a second position, which can be a non-cutting position.

The engaging formations can be configured to limit relative movement between the positioning device and the knife in a tangential direction relative to the pivot axis of the knife, and to permit relative movement between the positioning device and the knife in a radial direction relative to the pivot axis of the knife.

The positioning device can be configured to disengage the knife in the third position thereby enabling the knife to move laterally relative to the positioning device.

The engaging formations can comprise a rearwards-facing slot that opens through a rear edge of the knife and an engaging element provided on the positioning device that engages the slot.

The rearwards-facing slot can extend substantially in the direction of the pivot axis of the knife.

The positioning device can be pivotable about a pivot axis of the positioning device. The pivot axis can be located towards a rear end of the positioning device.

The positioning device can be arranged such that when the knife is at an intermediate position approximately midway between the cutting position and the non-cutting position, there can be substantial alignment between the pivot axis of the knife, the engaging formations and the pivot axis of the positioning device.

The control mechanism can control movement of the positioning device.

The control mechanism can include a control element that can be connected to the positioning device, and an actuator that can be connected to the control element and can be configured to move the control element between a primary position and a secondary position.

The control element can be configured for pivoting movement about a pivot axis of the control element between the primary position and the secondary position.

The pivot axis of the control element can be offset from the pivot axis of the positioning device.

The control mechanism can include a connecting element that can be connected to the positioning device.

The connecting element can comprise a resilient element that can be configured to enable movement of the positioning device relative to the control element by deformation of the resilient element. The connecting element protects the knife and control mechanism from damage when a hard body, such as a rock, encounters the knife.

The resilient element can comprise a kink spring, a coil spring or a flat spring.

The control mechanism can include a selection device for selective connecting the positioning device to the control element.

The selection device can comprise a connecting element between the resilient element and the control element that controls the connection between the resilient element and control element.

The knife has a rear edge that extends at an angle of at least 60° relative to the first bottom plate.

The cutter device can include at least one further knife, wherein the position of the further knife can be adjustable. The first bottom plate can include at least one further opening through which the further knife extends in the cutting position. The cutter device can include at least one further positioning device, wherein the further positioning device can be arranged to control movement of the further knife.

The cutter device can include a further selection element that can be arranged to select between a first selection configuration in which the further knife can be selected and a second selection configuration in which the further knife can be not selected. The cutter device can include a further selection control, which can be arranged to actuate the further selection element to select between the first and second selection configurations.

The cutter device can include a further resilient connecting element that can be configured to enable movement of the further positioning device relative to the control element by deformation of the further resilient connecting element.

The cutter device can include a plurality of adjustable knives, for example the cutter device can include between 20 to 40 knives. Each knife has its respective positioning device, respective opening in the first bottom plate, respective resilient connecting member, respective selection element and respective selection control. The adjustable knives can be configured to move separately or together or in groups between the cutting and non-cutting positions.

According to another aspect of the invention there is provided an agricultural harvester. The agricultural harvester can comprise a crop pick-up device. The agricultural harvester can comprise a crop receiving station. The agricultural harvester can comprise a cutter device as defined by any configuration described herein. The cutter device can be configured to transfer crop along a feed path from the crop pick-up device to the crop receiving station.

The agricultural harvester can comprise a round baler, a square baler or a loading wagon.

According to another aspect there is provided a method of accessing a knife in a cutter device for an agricultural harvester according to claim 34.

According to another aspect there is provided a method of accessing a knife in a cutter device for an agricultural harvester.

The method can include providing a cutter device.

The cutter device can comprise a rotor with a plurality of tines, wherein the rotor can be rotatable to transfer an agricultural crop along a feed path.

The cutter device can comprise a sub-assembly. The sub-assembly can include a pivot shaft. The sub-assembly can include a knife. The position of the knife can be adjustable between (i) a cutting position in the feed path in which it cooperates with the rotor to cut the crop, and (ii) a non-cutting position in which it can be withdrawn from the feed path. The knife can include an engagement formation located towards a front end of the knife that can be arranged to engage the pivot shaft.

The cutter device can include a bottom wall comprising a plurality of adjacent bottom plates. The bottom wall defines the crop feed path. A first bottom plate includes an opening through which the knife extends in the cutting position (or respective openings through which respective knives extend in their respective cutting positions). The sub-assembly can include the first bottom plate. In some embodiments, the sub-assembly can include at least one further bottom plate. However, it is preferred to only include the first bottom plate where possible to reduce the weight of the sub-assembly. The first bottom plate can be located beneath the rotor in a working condition. The crop feed path can be located between the rotor and the first bottom plate. The bottom wall can include a second bottom plate which is located in front of the first bottom plate in the crop material flow direction. The bottom wall can include a third bottom plate which is located behind the first bottom plate in the crop material flow direction. The cutter device can include a support frame.

The cutter device can include a positioning device mounted to the support frame. The positioning device can be arranged to control movement of the knife between the cutting position and the non-cutting position. The positioning device can be arranged to selectively disengage the knife to allow movement of the knife relative to the positioning device.

The cutter device can include a control mechanism mounted to the support frame. The control mechanism can be arranged to control movement of the positioning device.

The sub-assembly can be moveably mounted to the support frame. The sub-assembly can be arranged to move relative to the support frame in a lateral direction. The lateral direction can be transverse to a forward moving direction of the cutter device, when in use. The sub-assembly can be moveable between i) a working position in which the sub-assembly can be aligned with the support frame in a manner that enables the knife to be engageable by the positioning device, and ii) a maintenance position in which the knife can be laterally spaced apart from the positioning device and the sub-assembly protrudes laterally outwards from the support frame; unlocking the sub-assembly from the support frame.

The method can include sliding the sub-assembly in a first lateral direction to the maintenance position, thereby locating the knife in an accessible position.

The method can include sliding the sub-assembly in a second lateral direction, which is opposite to the first lateral direction, from the maintenance position to the working position.

An embodiment of the invention will now be described by way of example with reference to the accompanying drawings, in which.

Figure 1:
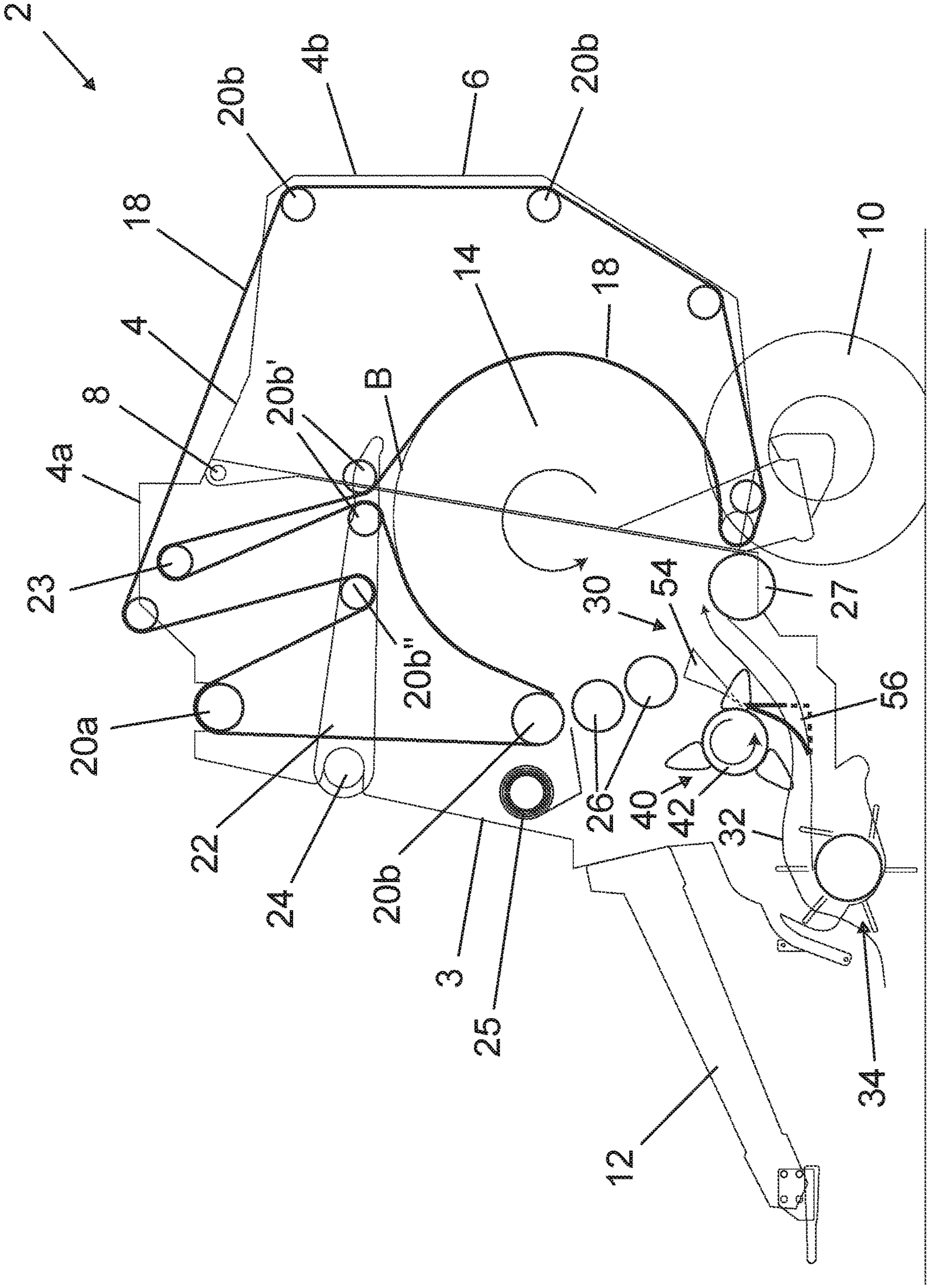
FIG. 1 is a schematic side section of a variable chamber round baler.

As previously noted, the present invention relates to a cutter device for an agricultural harvester, for example a round baler, a square baler or a loading wagon. In FIG. 1 of the accompanying drawings the cutter device is part of a variable chamber round baler. It should be noted that the cutter device may alternatively comprise part of another type of baler, for example a fixed chamber round baler or a square baler, or any other type of agricultural harvester, for example a loading wagon.

The variable chamber round baler 2 shown in FIG. 1 comprises a frame 3 and a housing 4 comprising a fixed part 4*a* and an openable rear part 4*b*, wherein the rear part 4*b* comprises a tailgate 6 that can pivot open about a pivot 8 in the upper part of the housing 4 to release a completed bale from the baler. The frame 3 and the fixed front part 4*a* of the housing 4 optionally comprise a unitary structure. The baler 2 is mounted on wheels 10 and has a drawbar 12 allowing it to be drawn by an agricultural vehicle such as a tractor. The baler 2 is configured to be driven from the power take off unit of the tractor (not shown).

The baler housing 4 encloses a baling chamber 14 within which a round (cylindrical) bale B can be formed from bale material, for example agricultural crop material. A bale forming zone is provided within the baling chamber 14, the shape of the bale forming zone being defined the side walls of the housing 4 and by one or more endless belts 18 that pass around a set of rollers 20*a*, 20*b*. At least one of the rollers is a drive roller 20*a* that is driven via the power take-off unit and drives the belts 18 causing them to rotate around the rollers 20*a*, 20*b*. The other rollers are undriven idler rollers 20*b* that rotate with the belts 18.

Two of the idler rollers 20*b* comprise tensioning rollers 20*b*', which are mounted on a tensioning arm 22. An intermediate roller 23 is located in the belt run between the movable rollers 20*b*'. The intermediate roller 23 guides the belt 18 as it runs from the rear part of the baling chamber 14 around the movable rollers 20*b*' and the intermediate roller 23, and back to the front part of the baling chamber 14. A third roller 20*b*" mounted on the arm 22 takes up any slack and effectively tensions the belts 18 as the arm 22 moves. The tensioning arm 22 can be pivoted about a pivot point 24 to accommodate a change in the size of the bale forming zone defined by the belts 18 within the baling chamber 14. A belt tensioner (not shown), for example a hydraulic or electric actuator, is connected between the tensioning arm 22 and the frame 3 and is operable to adjust the pressure on the tensioning arm 22 and the tension in the belts 18. This affects the degree of compression of the bale material and the density of the bale B.

Optionally, the baling chamber 14 is defined in part by one or more press rollers 26 and/or a starter roller 27, which do not engage the belts 18. The press rollers 26 and the starter roller 27 are located on opposite sides of a feed opening 30 through which bale material is fed into the baling chamber 14. The press rollers 26 and/or the starter roller 27 may optionally be driven rollers.

The baler includes a pick-up mechanism 34 for picking up bale material from the ground and feeding it into the baling chamber 14 along a feed path 32. A cutter device 40 comprising a rotating rotor 42 is provided to drive the bale material along the feed path 32 and optionally to cut the bale material before it enters the baling chamber.

The bale material is circulated within the baling chamber 14 and compressed by the rotating belts 18 and the rollers 20*a*, 20*b*, 26, 27 to form a round bale B. When the bale B has been formed and has reached the desired diameter it is bound with a suitable binding material, typically twine, net or film, which may be fed into the baling chamber 14 from a binding device 25 and wrapped around the bale B. The binding material may for example be fed into the baling chamber 14 between the lowermost idler roller 20*b* in the front part 4*a* of the housing and the upper press roller 26. The bound bale can be ejected from the baling chamber 14 onto the ground by opening the tailgate 6.

Except as described below, all the aforesaid features are conventional and they will not therefore be described in further detail.

Figure 2:
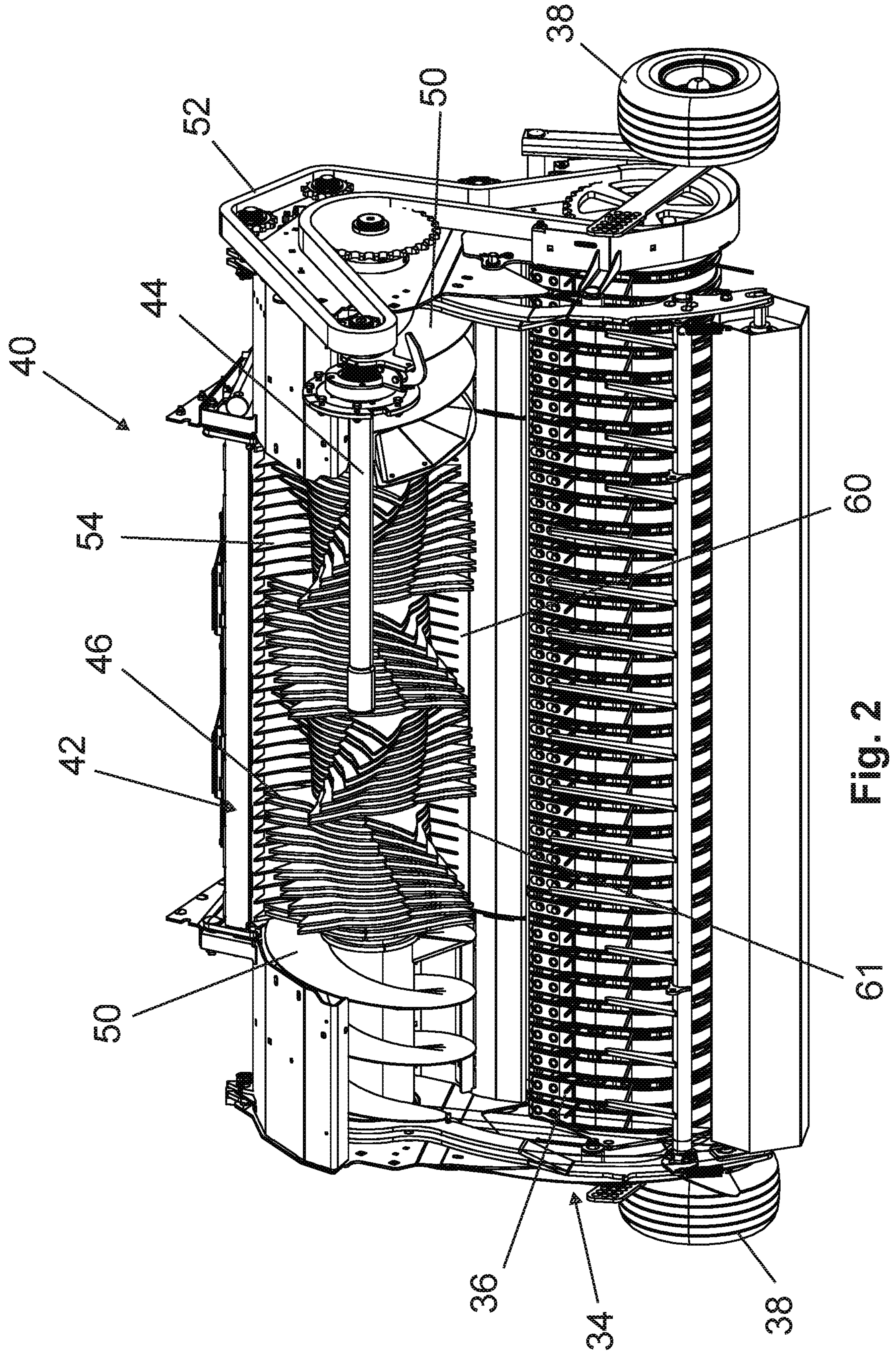
FIG. 2 is an isometric view of a pickup and cutter unit, which comprises a pickup mechanism and a cutter device.

The pick-up mechanism 34 and the cutter device 40 are shown in more detail in FIG. 2. The pick-up mechanism 34 is conventional and comprises a plurality of pick-up tines 36 that rotate to pick up the crop material from the ground and feed it to the cutter device 40. The pick-up mechanism 34 is supported on the ground by a pair of wheels 38 that are adjustable to adjust the height of the pick-up mechanism 34 above the ground.

The cutter device 40 is positioned above and behind the pick-up mechanism 34 and is configured to drive the bale material along the feed path towards the baling chamber 14. The cutter device 40 is also operable to cut the bale material if required before it enters the baling chamber 14.

Figure 3:
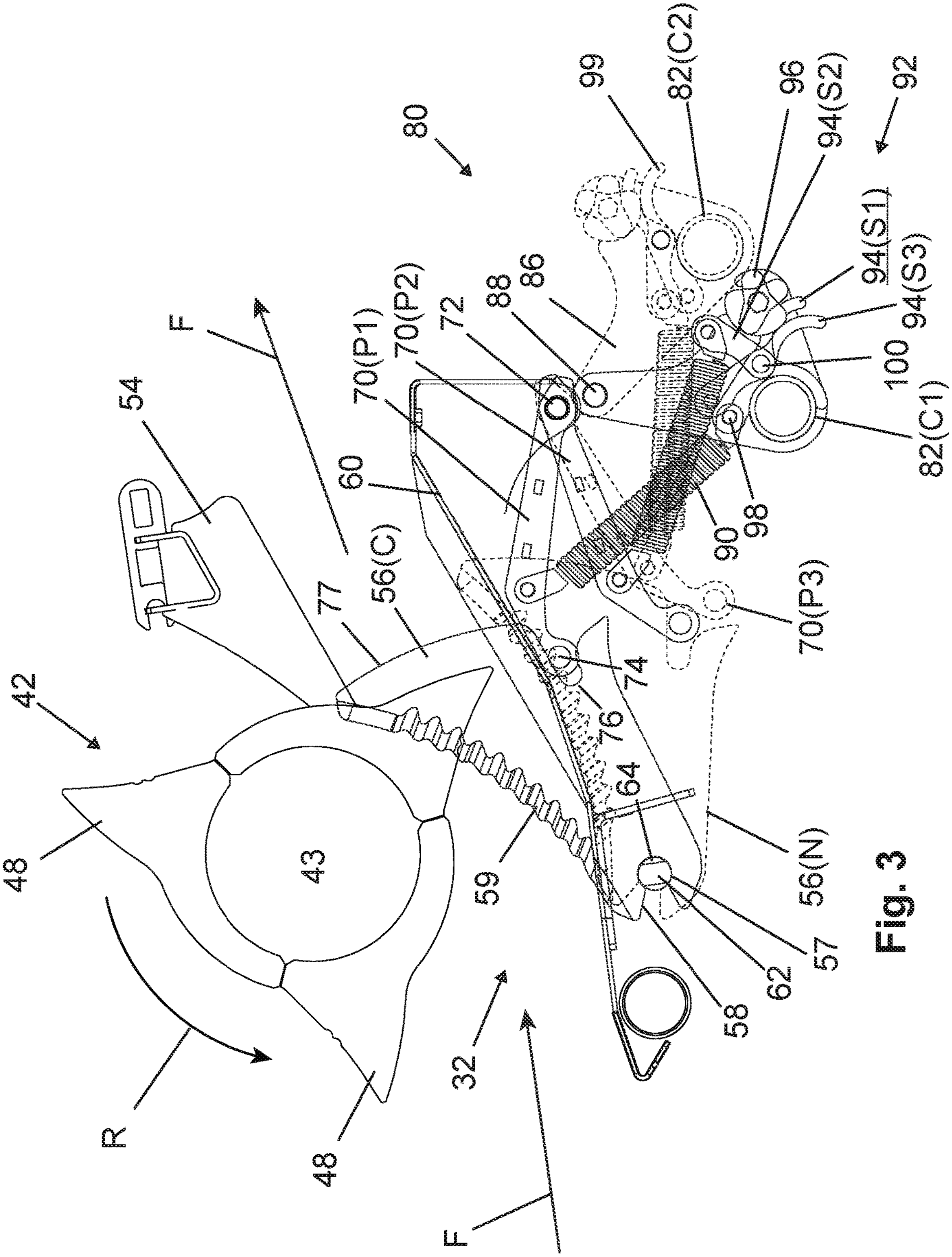
FIG. 3 is a side view of a cutting device, showing a knife in a cutting position and a non-cutting position, and showing a positioning device in a first position, a second position and a third position.

The cutter device 40 includes a rotating rotor 42 comprising a tube 43 and a plurality of tine plates 46 that are mounted on the tube 43. As depicted in FIG. 3, in this embodiment each tine plate 46 comprises three tines 48 that are spaced evenly around the axis of the tube 43, although the number and spacing of the tines may be different. Also in this embodiment the tine plates 46 are preferably attached to the tube 43 in pairs and the pairs of tine plates are set in a helical arrangement in which each pair of tine plates is offset from the adjacent pair of plates on each side thereof. Again, the arrangement of the tine plates 46 on the tube 43 may be different. Optionally, an auger 50 is provided at each end of the drive tube 43 to draw cut crop material inwards from the ends of the pick-up mechanism towards the centre thereof so that it can be fed into the baling chamber 14 by the cutter device 40.

The pick-up mechanism 34 and the cutter device 40 are both driven from a drive chain 52 by a main shaft 44, which is driven from the PTO of the tractor. Alternatively, a different drive mechanism may be provided.

Figure 7:
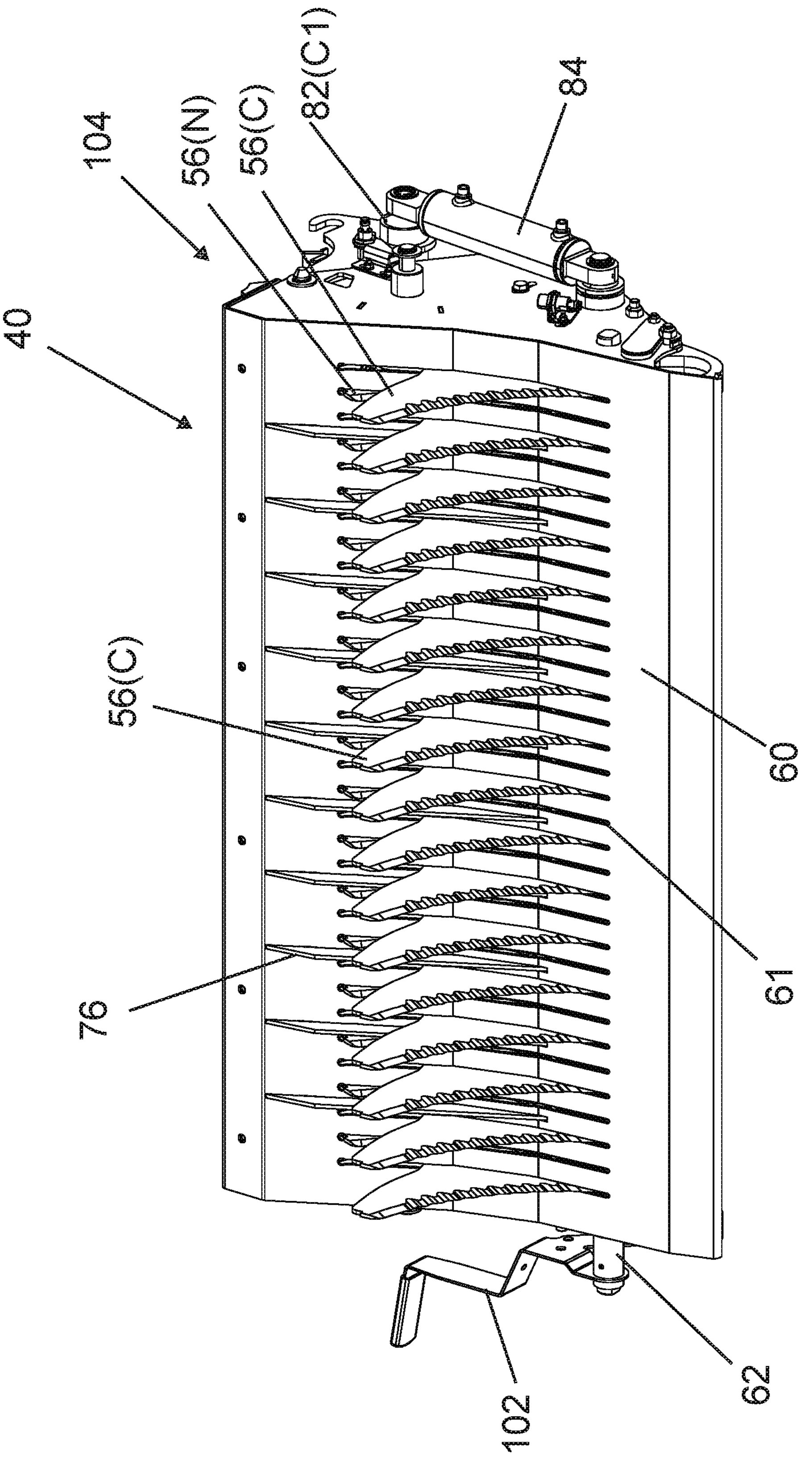
FIG. 7 is an isometric view of a base structure of the cutting device, showing a first set of knives in the cutting position and a second set of knives in the non-cutting position, together with an attached knife detachment handle.
Figure 8:
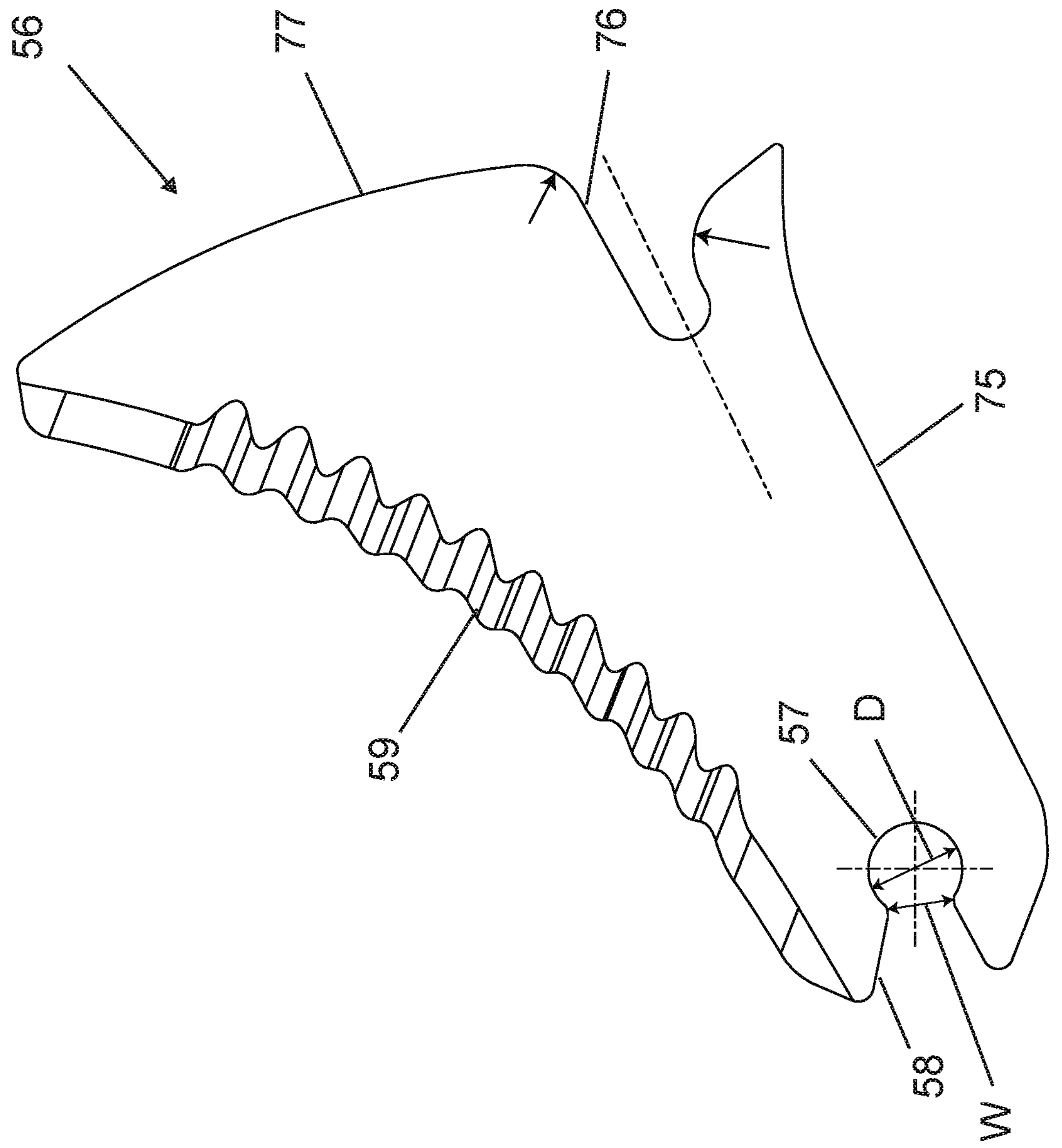
FIG. 8 is a side view of a knife from the cutter device.

As shown in FIGS. 2 and 3, a retainer mechanism 54 in the form of a comb is provided above and behind the rotating rotor 42 to remove cut crop material from the rotor after it has passed along the feed path 32. A plurality of knives 56 are provided below and behind the rotating rotor 42 to cut the crop material as it is carried along the feed path 32 by the rotating rotor 42. The knives 56 extend into the feed path 32 through slots 61 in a bottom plate 60 located beneath the rotating rotor 42. More details of the knife 56 and the bottom plate 60 are shown in FIGS. 7 and 8. Alternatively, the positions of the rotor, the knives and the bottom plate may be inverted, so that the rotor is placed below the plate and the knives (the plate then being referred to as a top plate).

FIG. 3 depicts the main components of the cutter device 40, including the rotor 42, the retainer mechanism 54, the bottom plate 60 and one of the knives 56. The rotor 42 rotates in a rotation direction R and feeds crop material along a feed path 32 between the rotor 42 and the bottom plate 60 in a flow direction F.

The following description of the structure of the knife 56 and the control system for moving the knife 56 is applicable to at least some, and typically each, of the knives 56. The knife 56 is shown in solid lines in a raised cutting position C in which it extends into the feed path 32 through a slot 61 in the bottom plate 60. When the knife 56 is in the cutting position C it cooperates with the tines 48 on the rotating rotor 42 to cut the crop material as it is driven along the feed path 32. In this embodiment the knife 56 extends through the gap between a pair of tines 48 so that the tines pass by on opposite sides of the knife 56 to produce a cutting action. The knife 56 has a cutting edge 59, which may be serrated.

The knife 56 is also shown in broken lines in a non-cutting position N in which it is lowered through the slot 61 so that it lies below the bottom plate 60 and does not extend substantially into the feed path 32. When the knife 56 is in the non-cutting position N it does not significantly come into contact with crop material moving along the feed path 32 and the crop material is therefore fed by the rotating rotor 42 to the baling chamber 14 without being cut.

The knife 56 is approximately triangular-shaped and is pivotable between the cutting position C and the non-cutting position N by pivoting about a knife pivot shaft 62 located towards the front end of the knife 56. The pivot shaft 62 is preferably partially circular in cross section and fits within a circular hole 57 provided at the front end of the knife, allowing rotation of the knife 56 about the pivot shaft 62.

The pivot shaft 62 has a pair of flat faces 64 on opposite sides of the shaft, wherein the distance between the faces 64 is less than the diameter of the pivot shaft 62. The knife 56 includes a shaft slot 58 that preferably extends forwards from the hole 57 to the front end of the knife 56. The minimum width of the shaft slot 57 is greater than the distance between the faces 64, allowing the shaft 62 to pass through the shaft slot 57 when the slot and the faces 64 are aligned. This allows the knife 56 to be attached to and detached from the shaft 62. If the shaft slot 57 is not aligned with the faces 64 of the shaft 62 the knife 56 cannot be detached from the shaft 62.

The pivot shaft 62 and the knife 56 therefore have complementary looking formations comprising the shaft slot 57 and the faces 64 that lock the knife 56 to the pivot shaft 62 in a first configuration and allow separation of the knife from the pivot shaft in a second configuration. The pivot shaft 62 and the knife 56 are adjustable between the first configuration and the second configuration by relative rotation of the knife 56 and the pivot shaft 62. Relative rotation can be achieved by rotating the knife 56 about the pivot shaft 62 and/or by rotating the pivot shaft 62 about its axis.

The knife 56 can be moved between the cutting position C and the non-cutting position N by a positioning device 70. In this employment the positioning device 70 comprises an arm that can be pivoted about a pivot point 72 located at or near the rear end of the positioning device 70. A first engaging formation 74 is provided at the front end of the positioning device 70, which engages a complementary second engaging formation 76 provided towards the rear end of the knife 56. In this embodiment the first engaging formation 74 comprises a pin and the second engaging formation 76 comprises a slot that opens through the lower rear edge 77 of the knife 56. The slot extends forwards towards the pivot axis of the knife 56, which is defined by the axis of the pivot shaft 62.

The positioning device 70 can be pivoted between a first position P1 in which it positions the knife in the cutting position C and a second position P2 in which it positions the knife in the non-cutting position N. The positioning device 70 can also be moved to a third position P3 below the second position P2, where it can be disengaged from the knife 56 to allow the knife to move independently of the positioning device 70, at least towards the cutting position C. The positioning device 70 is thus configured to engage the knife 56 and prevent significant movement of the knife independently of the positioning device 70 when the positioning device is in the first position P1 and at intermediate positions between the first position P1 and the second position P2. The term "significant movement" as used herein means movement that exceeds normal play between the knife 56 and the positioning device 70.

The knife 56 is therefore positively connected to the positioning device 70 at the first position P1 and at intermediate positions between the first position P1 and the second position P2, so that the knife 56 cannot move significantly without corresponding movement of the positioning device 70. When the positioning device 70 is in the third position P3 it disengages from the knife, which allows lateral movement of the knife 56.

The positioning device 70 and the complementary engaging formations 74, 76 may take different forms. For example, the positioning device and the knife may have complementary engaging formations that are configured to maintain engagement between the positioning device and the knife in the first position P1 and the second position P2 and all intermediate positions in between the first and the second position, and to permit disengagement of the positioning device from the knife in the third position P3 at least in the direction of movement towards the cutting position. Optionally, the engaging formations 74, 76 may be configured to limit relative movement between the positioning device 70 and the knife 56 in a tangential direction relative to the pivot axis of the knife, and to permit relative movement between the positioning device and the knife in a radial direction relative to the pivot axis of the knife.

The cutter device also includes a control mechanism 80 that controls movement of the positioning device 70 between the first position P1, the second position P2 and the third position P3. The control mechanism 80 includes a control element 82 that is connected to the positioning device 70, and an actuator 84 (shown in FIG. 7) that is connected to the control element 82 and is configured to move the control element between a primary position C1 and a secondary position C2.

In this embodiment the control element 82 comprises a bar that extends transversely across the cutter device 40 substantially parallel to the axis of the rotor 42. The bar is attached by pivot arms 86 to a pivot axis 88, which is preferably located adjacent to, for example just below, the pivot point 72 of the positioning device 70. The pivot arms 86 pivot about the pivot axis 88, allowing the control element 82 to swing between the primary position C1 that is shown in FIG. 3 in solid lines and the secondary position C2 that is shown in broken lines. In this embodiment the primary position C1 comprises a forward position and the secondary position C2 comprises a rearward position.

The control mechanism 80 further comprises a connecting element 90 that is connected to the positioning device 70. In this embodiment the connecting element 90 comprises a resilient connecting element that is configured to enable movement of the positioning device 70 relative to the control element 82 by deformation of the connecting element 90. The resilient connecting element 90 may for example comprise a kink spring, a coil spring or a flat spring. As described below, resilient connecting element 90 provides an overload protection mechanism 91 that allows the knife 56 to move from the cutting position C to the non-cutting position N when subjected to an overload force, for example when an obstruction such as a rock passes along the feed path between the rotor and the knife.

The control mechanism 80 includes a selection mechanism 92. The selection mechanism 92 is arranged to enable alternative connection configurations between the positioning device 70 and the knife 56 to be selected. The connecting element 90 may be connected to the control element 82 by the selection mechanism 92. These alternative connection configurations include a first selection configuration comprising a selected configuration in which the positioning device 70 engages the knife and controls movement of the knife between the cutting position C and the non-cutting position N, and a second selection configuration comprising a de-selected (or non-selected) configuration in which the positioning device 70 allows the knife to return to the non-cutting position N, regardless of the position of the control element 82. In at least some arrangements, when the knife 56 is de-selected by the selection mechanism 92 the positioning device 70 does not fully disengage the knife 56, for example to help facilitate selection of the knife 56 at a later time. In other arrangements, the positioning device 70 fully disengages the knife 56, at least at the third position.

In an embodiment, when a knife 56 is deselected, it is brought first to an intermediate position between the cutting position C and the non-cutting position N, and the positioning device then allows the knife to fall from the intermediate position to the non-cutting position. Typically, the intermediate position is approximately midway between the cutting position C and the non-cutting position N. The intermediate position can be 20%-50% of the total range of movement from the non-cutting position to the cutting position.

The selection mechanism 92 allows a user to select which of the plurality of knives 56 are moved to the cutting position C when the control element 82 moves from the secondary position C2 to the primary position C1. Each de-selected knife 56 is moved to a position that is intermediate between the non-cutting position N and the cutting position C. The knives 56 may return to the non-cutting position N under the force of gravity and/or as a result of being pressed downwards by bale material passing along the feed path 32.

In the embodiment shown in the drawings the selection mechanism 92 comprises a selection element, such as a selection lever 94, and a selection device, such as a selection control 96. The selection lever 94 has a first end 98 that is attached to the connecting element 90 and a free second end 99. The selection lever 94 is attached to the pivot arm 86 through a pivot connection 100 that is located between the first and second ends 98, 99. The selection lever 94 can be pivoted between a first position S1 in which the first end 98 engages the control element 82 and a second position S2 in which the second end 99 engages the control element 82.

In this embodiment the selection control 96 comprises a radial cam surface 97 that can engage the second end 99 of the selection lever 94. The selection control 96 is mounted on a hexagonal bar 96*a*. The selection control 96 can be rotated to adjust the position of the selection lever 94 between the first position S1 in which the first end 98 engages the control element 82 and an intermediate third position S3 between the first position S1 and the second position S2, in which the first end 98 disengages the control element 82. Subsequent movement of the selection lever 94 between the third position S3 and the second position S2 will be described below. At least some selection controls 96, and typically each selection control 96, is mounted on the same hexagonal bar 96*a*, and are therefore actuated simultaneously by rotating the hexagonal bar 96*a*.

Figure 4:
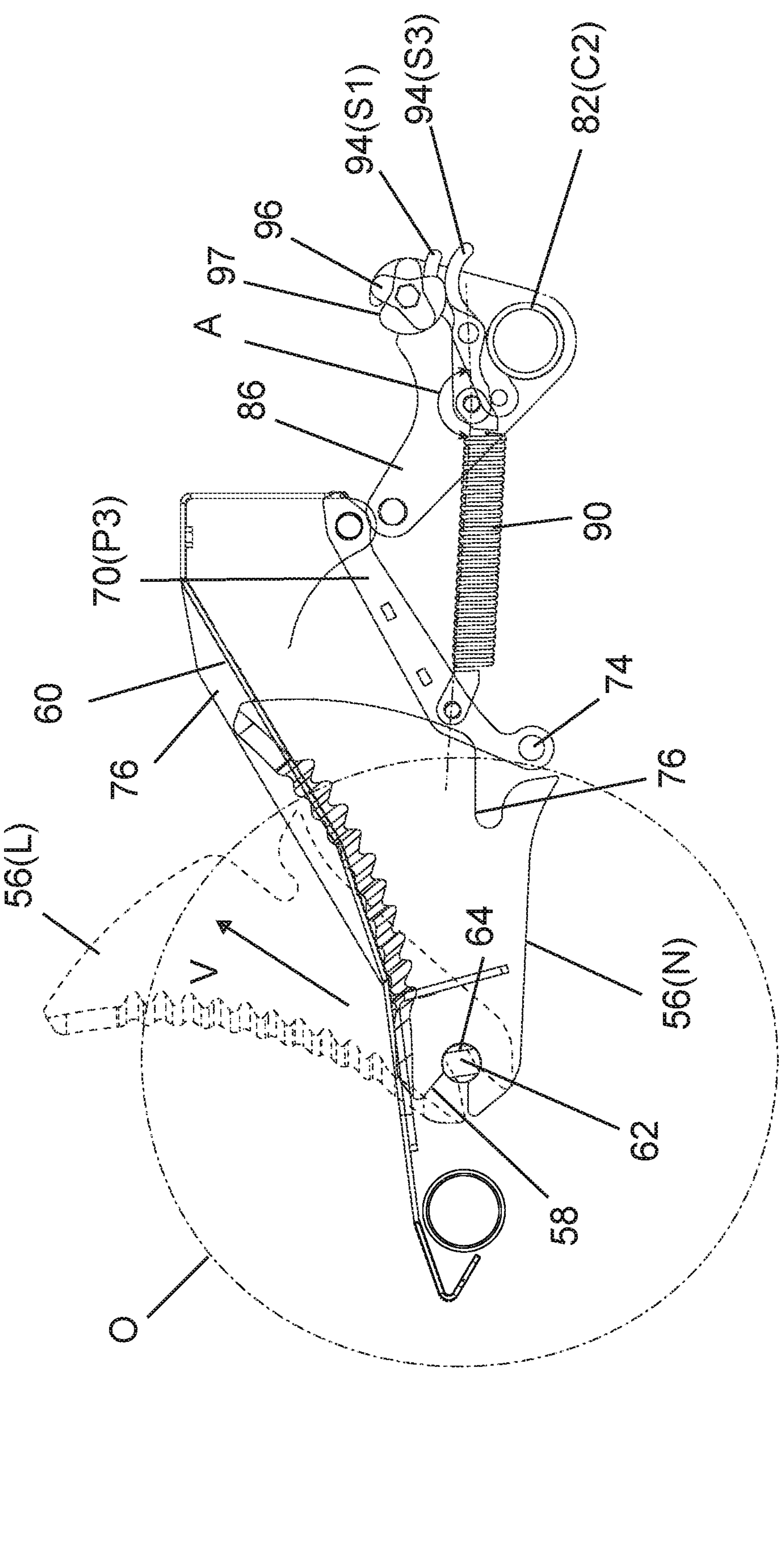
FIG. 4 is a side view of a knife mechanism, showing the positioning device in the third position and showing the knife in the non-cutting position and a detaching position.

FIG. 4 shows the positioning device 70 in the third position P3 in which the first engaging formation 74, e.g. comprising a pin, is withdrawn from the second engaging formation 76 comprising the slot that opens through the rear edge 77 of the knife, so that the positioning device 70 is disengaged from the knife 56. This allows the knife 56 to move independently of the positioning device 70. The knife 56 is shown in solid lines in the non-cutting position N and also in broken lines in the detachment or removal position L, in which the knife is rotated beyond the cutting position C. Owing to the disengagement of the positioning device 70 the knife 56 can be rotated freely, for example by hand, in a circular path O around the pivot shaft 62 from the non-cutting position N to the removal position L.

The pivot shaft 62 can also if necessary be rotated about its axis from a locked configuration shown in solid lines to an unlocked configuration shown in broken lines in which the faces 64 on the sides of the shaft are aligned with the shaft slot 58 of the knife 56. This allows the knife 56 to be removed by pulling it rearwards in a removal direction V. A knife detachment handle 102, for example as shown in FIG. 7, may optionally be provided for rotating the pivot shaft 62.

Figure 5:
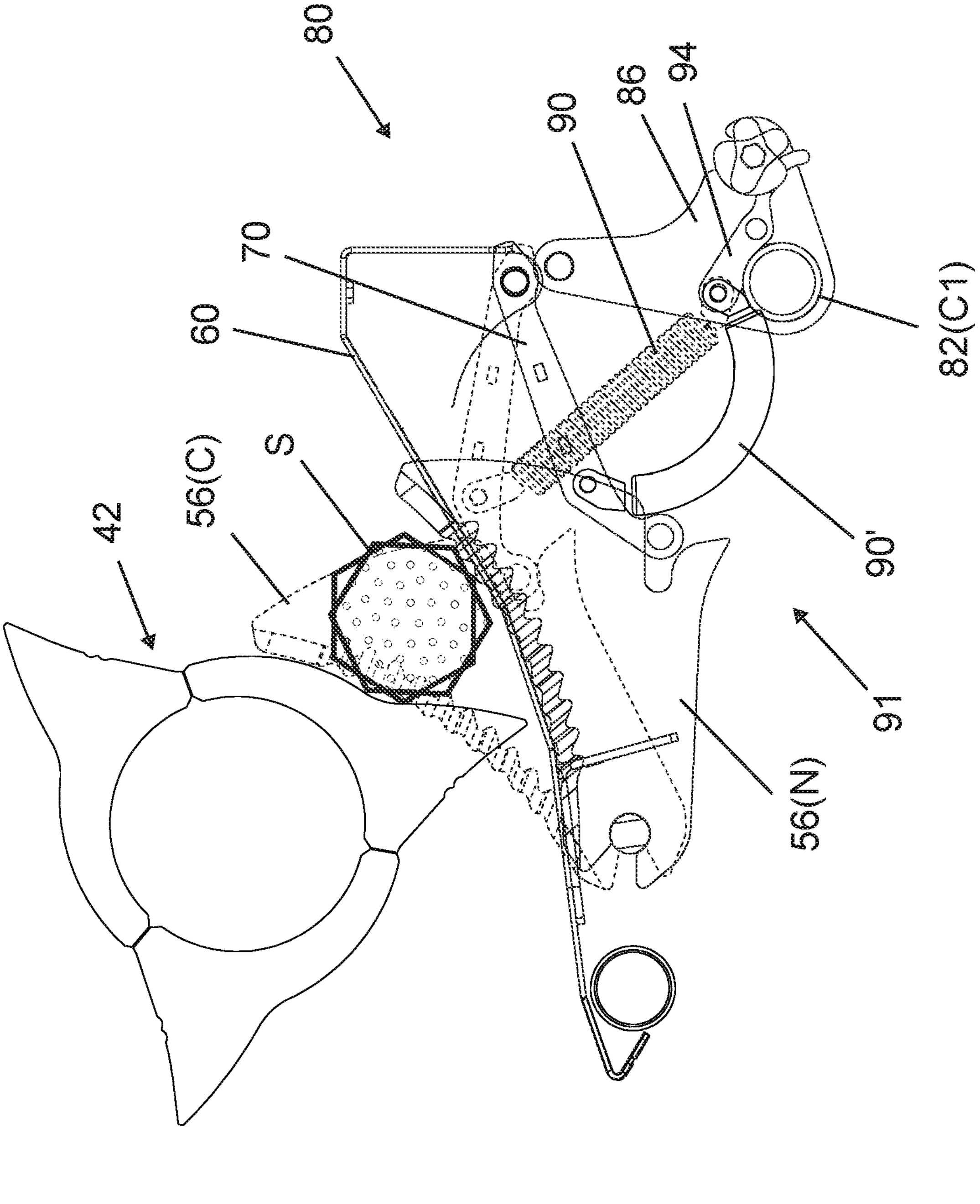
FIG. 5 is a side view of the cutting device, showing the knife in the cutting position and displaced towards the non-cutting position in response to an obstacle moving along a feed path.

FIG. 5 illustrates operation of the overload protection mechanism 91 that allows the knife 56 to move from the cutting position C towards the non-cutting position N when subjected to an overload force, for example when an obstruction S such as a stone or rock passes along the feed path between the rotor 42 and the knife 56.

The control mechanism 80 comprises a connecting element 90 that is connected between the selection lever 94 and the positioning device 70. In this embodiment the connecting element 90 comprises a resilient connecting element, for example a kink spring, a coil spring or a flat spring. The resilient connecting element 90 is configured to enable movement of the positioning device 70 relative to the control element 82 by deformation of the connecting element 90.

For example, if an obstruction S such as a stone or rock passes along the feed path between the rotor 42 and the knife 56, the obstruction may press the knife 56 downwards from the cutting position C as shown in broken lines towards the non-cutting position N shown in solid lines, allowing the obstruction S to pass along the feed path without damaging either the rotor 42 or the knife 56. The force applied by the obstruction S to the knife 56 causes the resilient connecting element 90 to deform elastically, for example by bending. In FIG. 5 the deformed connecting element 90' is shown in solid lines. After the obstruction S has passed, the resilient connecting element 90 resumes its normal undeformed shape as shown in broken lines, thereby returning the knife 56 to the cutting position C.

Figure 6:
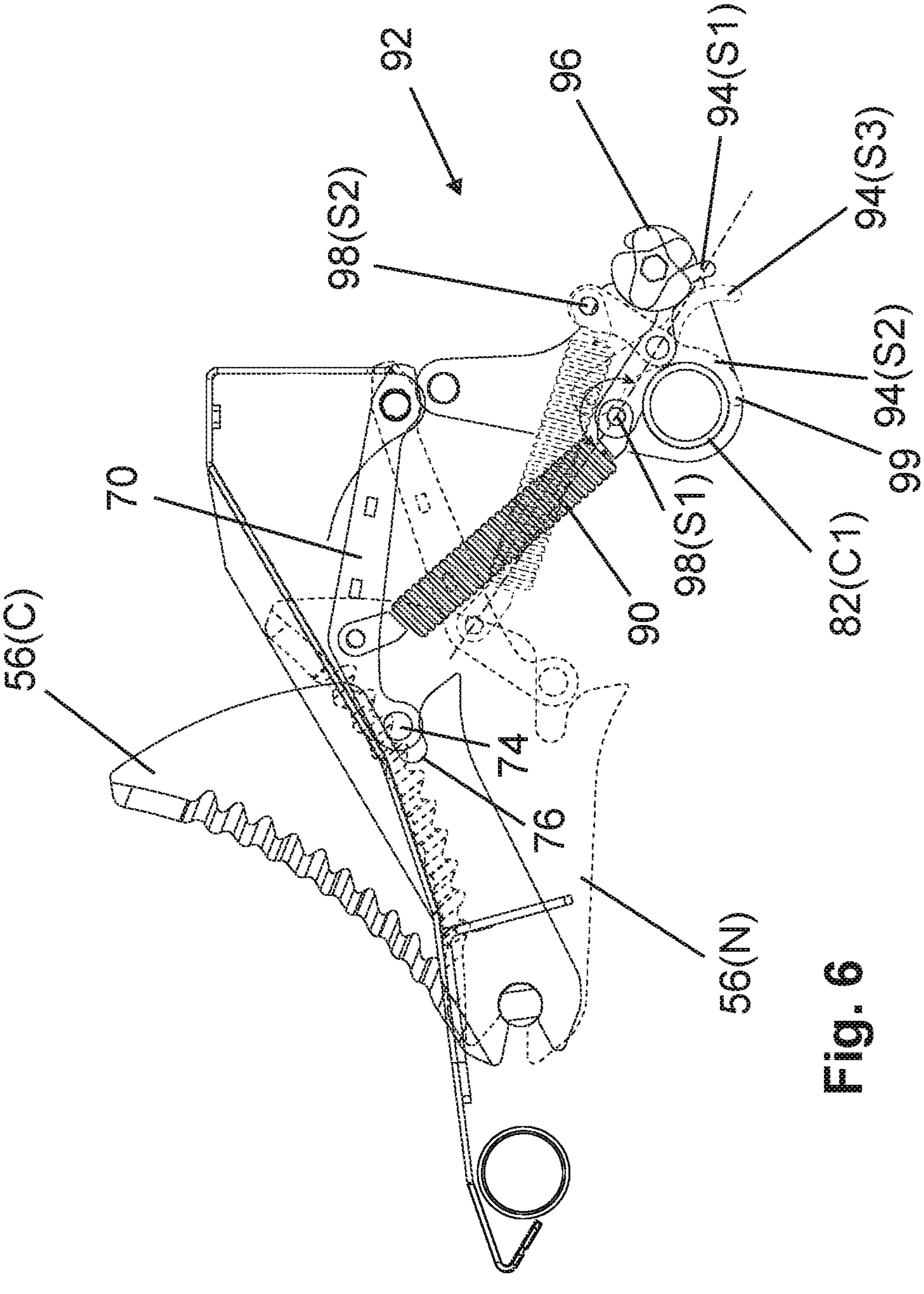
FIG. 6 is a side view of the knife mechanism, showing the knife in the cutting position and the non-cutting position, and showing the positioning device and a selection control in first and second positions.

FIG. 6 illustrates two different configurations of the selection mechanism 92 with the control element 82 in the secondary position S2. In the first configuration shown in solid lines, the knife 56 is held in the cutting position C by the positioning device 70. The selection lever 94 lies in the first position S1 in which the first end 98 of the selection lever 94 is pressed against the control element 82 by the connecting element 90.

In the second configuration shown in broken lines, the knife 56 is in the non-cutting position and the selection lever 94 is in the second position S2 in which the second end 99 of the selection lever 94 is pressed against the control element 82.

FIG. 7 is an isometric view of a base structure 104 of the cutting device, showing upper parts of a first set of knives 56(C) in the cutting position C and a second set of knives 56(N) in the non-cutting position N. In this embodiment the first and second sets of knives alternate along the length of the base structure 104. However, the knives may be arranged in differently in numerous alternative sets. Only the tips of the second set of knives 56(N) can be seen as the knives have been retracted through the slots 61 and are located almost entirely below the bottom plate 60. The first set of knives 56(C) extend through the slots 61 in the bottom plate 60 into the feed path of the bale material. A number of reinforcing plates 76 are attached to the upper surface of the bottom plate 60 to strengthen it and increase its rigidity.

An actuator 84 is connected to the control element 82 and is configured to move the control element between the primary position C1 and the secondary position C2 to move the selected knives 56 between the cutting position C and the non-cutting position N. An optional knife detachment handle 102 is shown removably attached to one end of the pivot shaft 62. The knife detachment handle 102 allows the pivot shaft 62 to be rotated about its axis from the locked configuration to the unlocked configuration, allowing the knife 56 to be removed by pulling it in the removal direction V.

The knife 56 is shown in more detail in FIG. 8. The knife 56 is approximately triangular in shape and has a cutting edge 59, which may optionally be serrated, a bottom edge 75 and a rear edge 77. A circular hole 57 is provided at the front end of the knife to receive the pivot shaft 62, allowing the knife 56 to pivot between the cutting position C and the non-cutting position N.

A shaft slot 58 extends from the hole 57 to the edge of the knife 56. In this embodiment the shaft slot 58 extends forwards from the hole 57 to the front end of the knife 56, but it could alternatively extend downwards. The minimum width W of the shaft slot 58 is less than the diameter D of the hole 57 and less than the diameter of the pivot shaft 62, but greater than the distance between the faces 64 of the pivot shaft 62. This allows the shaft 62 to pass through the shaft slot 57 when the slot 58 and the faces 64 are aligned. This enables the knife 56 to be detached from the shaft 62 and attached to the shaft. If the shaft slot 58 is not aligned with the faces 64 of the shaft 62 the knife 56 cannot be detached from the shaft 62.

The knife 56 includes the second engaging formation 76, which engages the first engaging formation 74 of the positioning device 70. The second engaging formation 76 is provided towards the rear end of the knife 56. In this embodiment the second engaging formation 76 comprises a slot that opens through the rear edge 77 of the knife 56 and extends forwards towards the pivot axis of the knife 56, which is defined by the axis of the pivot shaft 62 and the centre of the hole 57. Optionally, the rear edge 77 extends at an angle of at least 60° relative to the bottom plate 60 so that it helps to prevent crop material being drawn into the opening in the bottom plate and helps to remove accumulated dirt from the slot 61 as the knife 56 moves from the cutting position C to the non-cutting position N.

FIGS. 9 to 13 illustrate movement of the knife 56 and interaction between the knife and the control mechanism 80 as the knife moves between its various positions.

Figure 9:
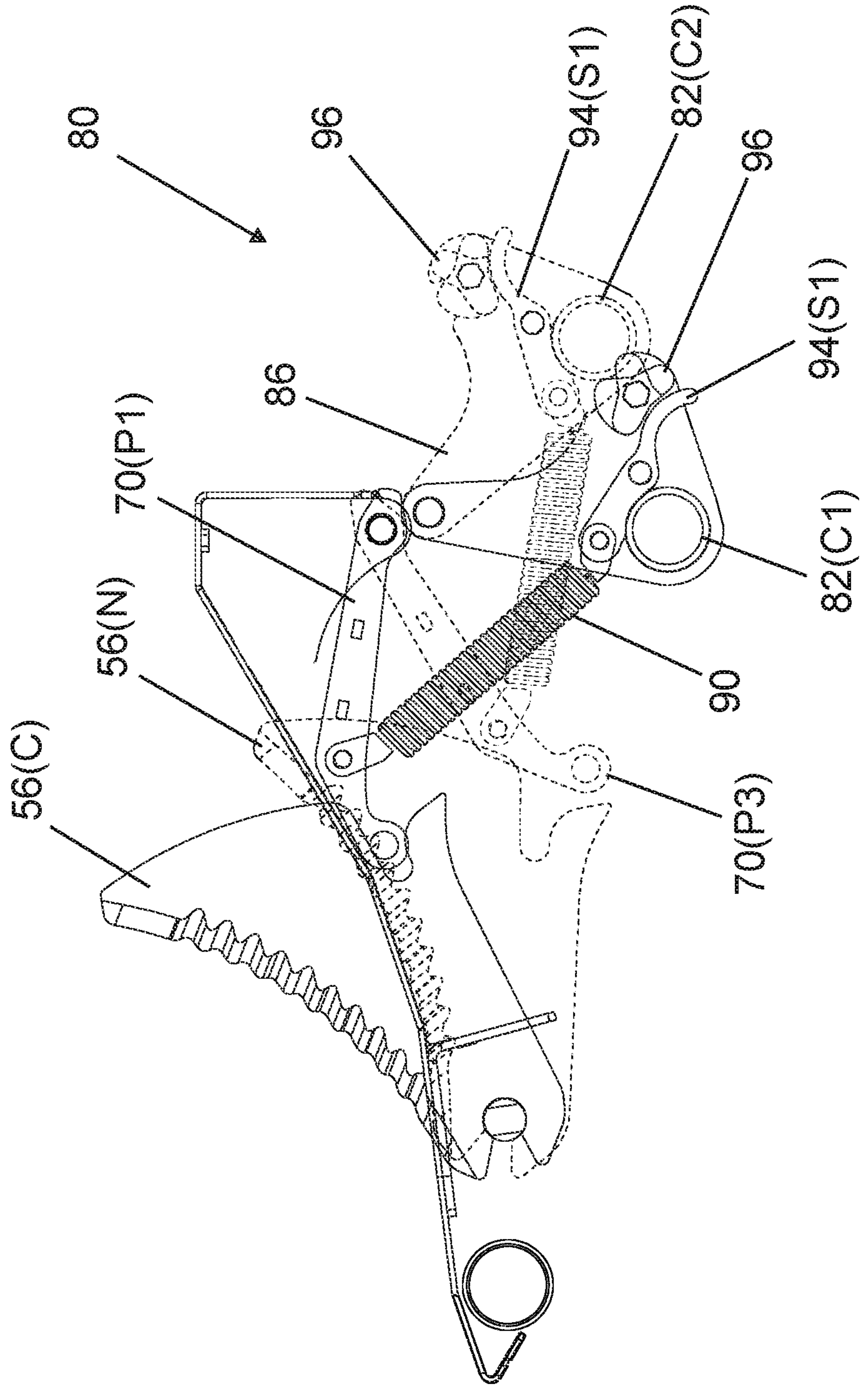
FIG. 9 is a side view of the knife mechanism, showing the knife in the cutting position and the non-cutting position, the positioning device in the first position and the third position, and the selection control in the first position.

In FIG. 9 the knife 56 is shown in solid lines in the cutting position C. The control element 82 is in the primary position C1 and the positioning device 70 is located in the first position P1 in which it is fully engaged with the second engaging formation 76 so that it holds the knife 56 in the cutting position C.

The knife 56 is also shown in broken lines in the non-cutting position N with the control element 82 in the secondary position C2 and the positioning device 70 in the third position P3, in which it is disengaged from the knife 56. Movement of the control element 82 from the secondary position C2 to the primary position C1 will cause the positioning device 70 to engage the second engaging formation 76 and move the knife 56 from the non-cutting position N to the cutting position C. In both configurations the selection device 96 is in the selection position and the selection lever 94 is in the first position S1 in which it is pressed against the control element 82, so that the knife 56 moves with the control element 82 between the cutting position C and the non-cutting position N.

Figure 10:
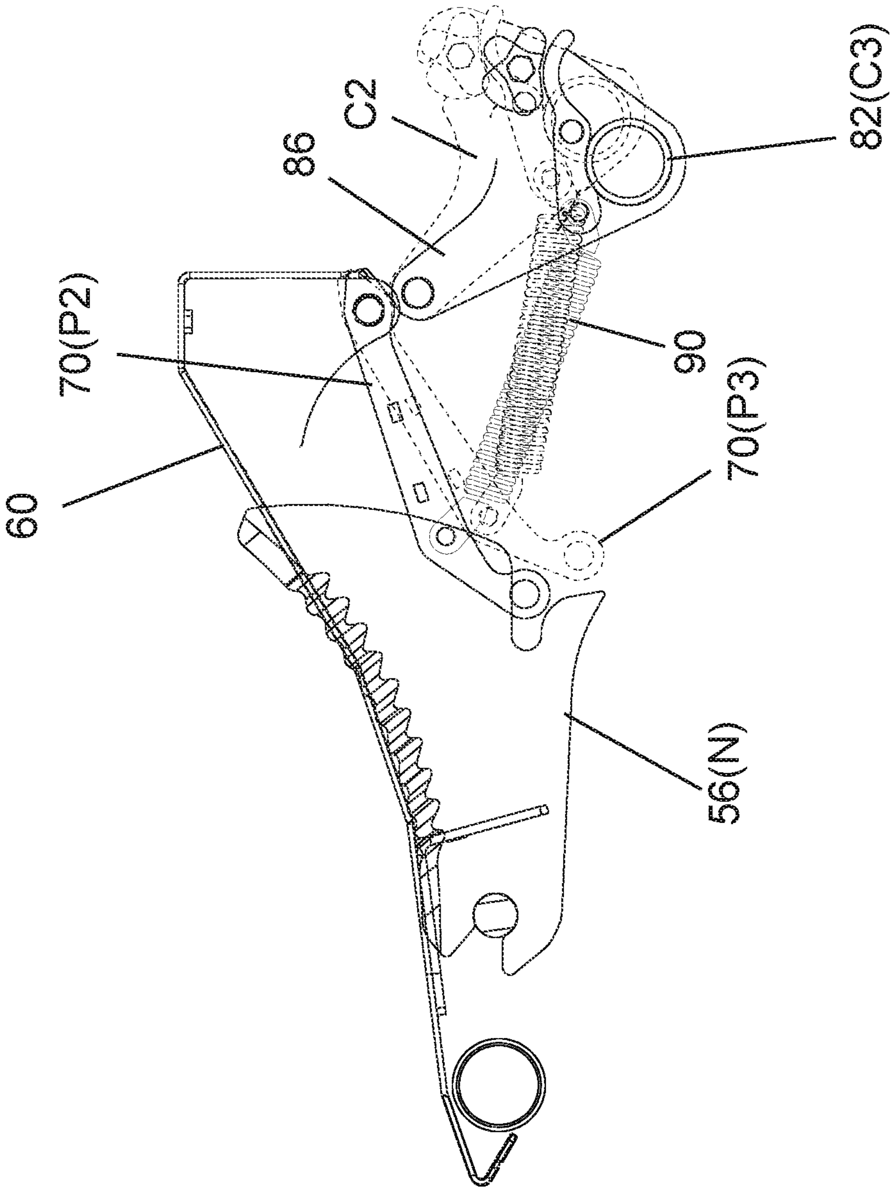
FIG. 10 is a side view of the knife mechanism, showing the knife in the non-cutting position, the positioning device in the second position and the third position, and the control element in an intermediate position in which the positioning element is catching the knife.

FIG. 10 shows the knife 56 in the non-cutting position N. The control element 82 is shown in solid lines in an intermediate position C3 as it moves between the secondary position C2 and the primary position C1. The selection device 96 is in the selection position so that the knife 56 moves with the control element 82. The positioning device 70 is shown in solid lines in the second position P2 in which it is engages with the second engaging formation 76 of the knife 56. The positioning device 70 is also shown in broken lines in the third position P3, in which it is disengaged from the knife 56. As noted above, movement of the control element 82 from the secondary position C2 towards the primary position C1 causes the positioning device 70 to engage the second engaging formation 76 and move the knife 56 from the non-cutting position N towards the cutting position C.

Figure 11:
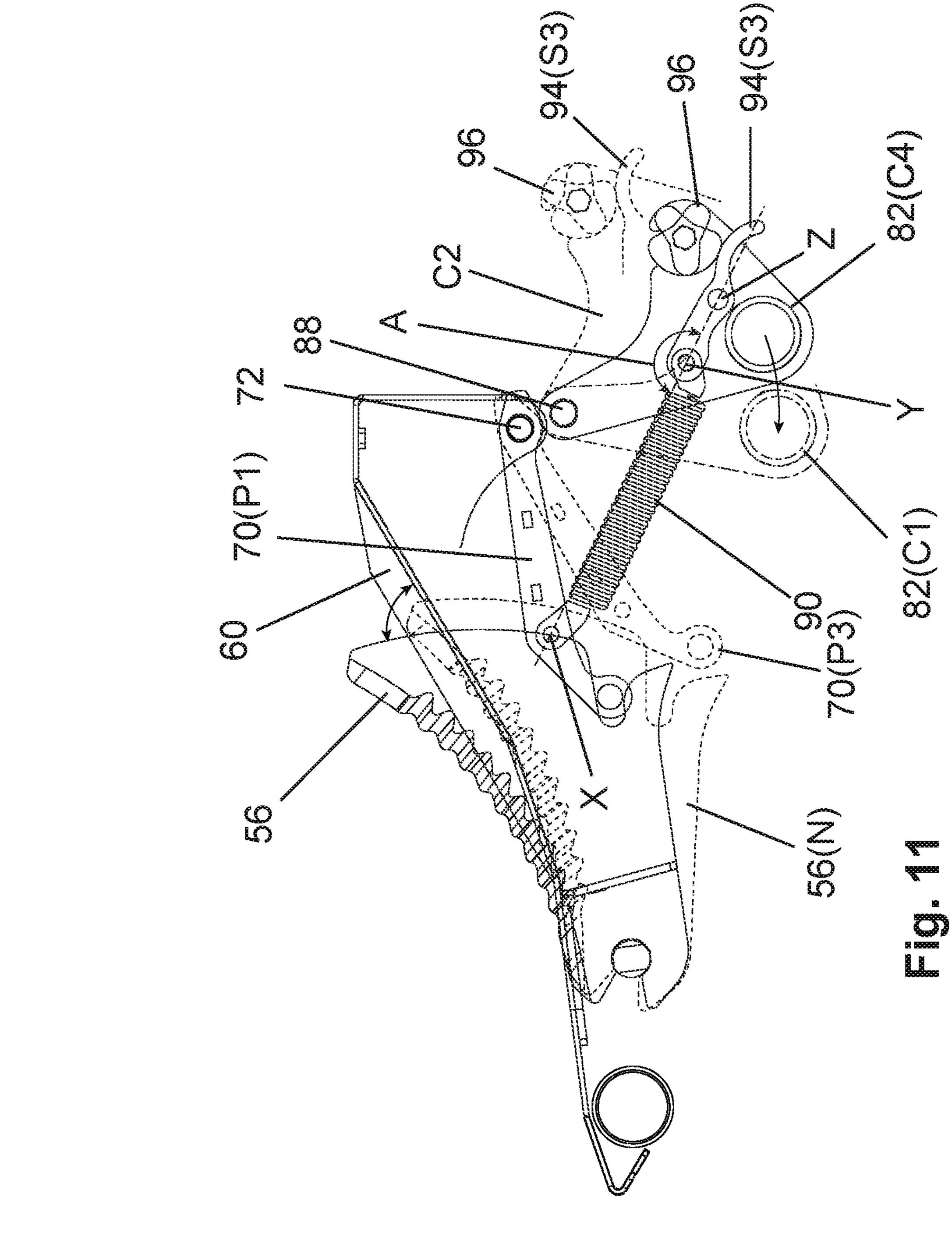
FIG. 11 is a side view of the knife mechanism, showing the knife in the non-cutting position and in an intermediate position between the cutting position and the non-cutting position, and showing the positioning device in the third position and an intermediate position in which the selection lever is tipping over to de-select the knife.
Figure 12:
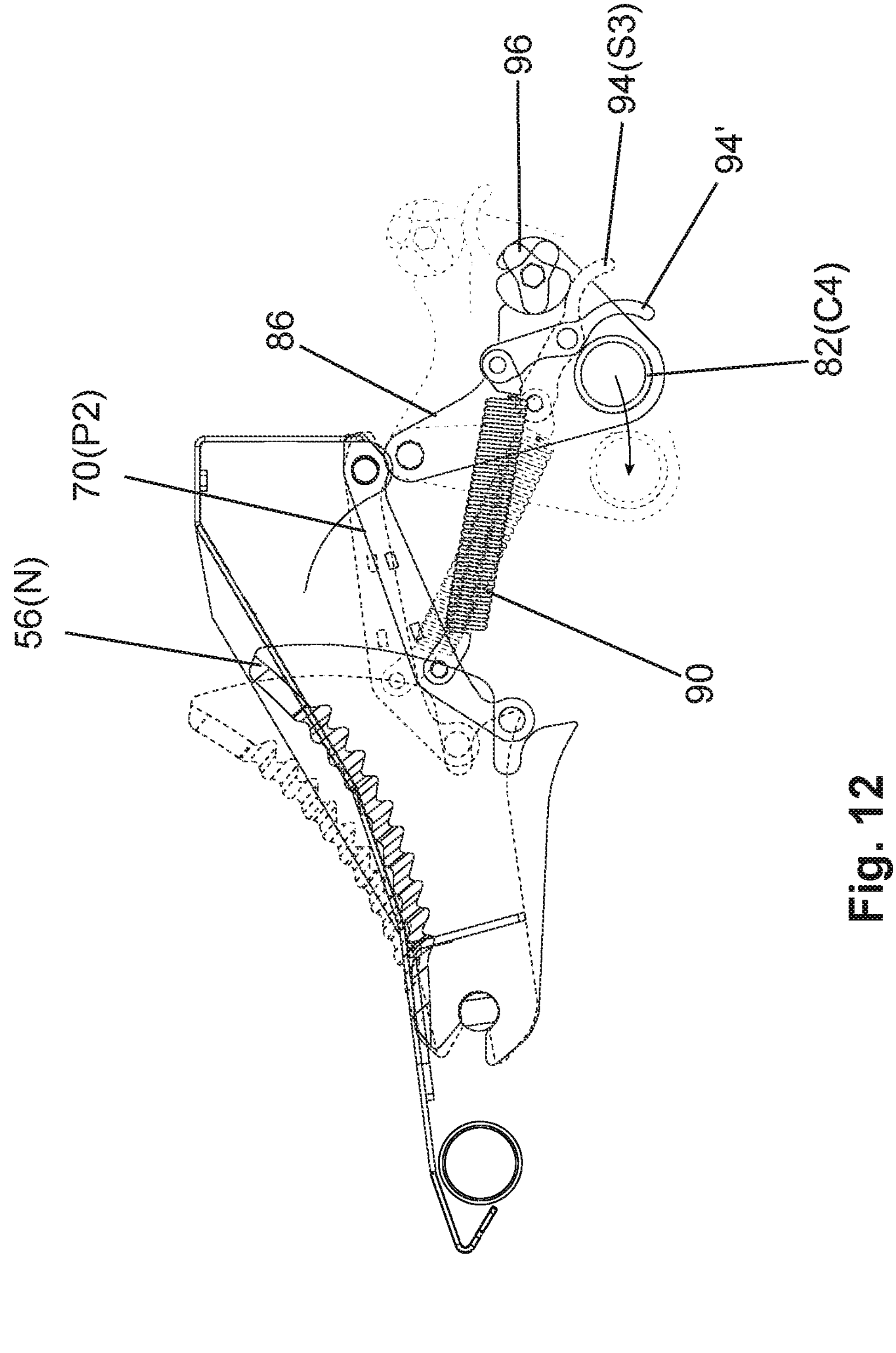
FIG. 12 is a side view of the knife mechanism, showing the knife in the non-cutting position and in an intermediate position between the cutting position and the non-cutting position, and showing the positioning device in the second position and an intermediate position where the selection lever is tipping over to de-select the knife.
Figure 13:
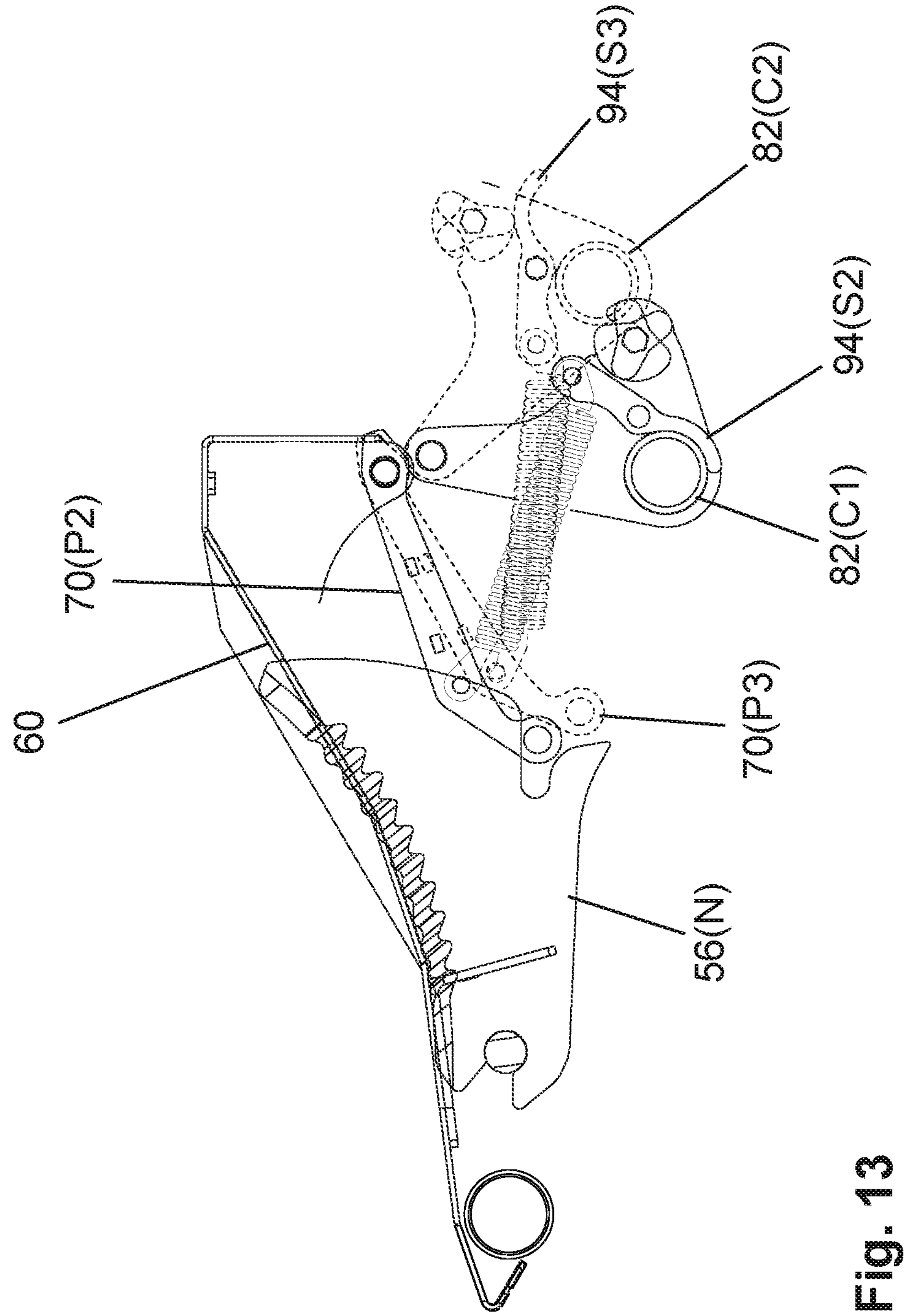
FIG. 13 is a side view of the knife mechanism, showing the knife in the non-cutting position, and showing the control element in the secondary position while the selection device has been activated to de-select the knife, and also showing the control element in the primary position whereby the selection lever is fully tipped over so that the knife is de-selected.

FIGS. 11 to 13 illustrate a process for deselecting a knife by at least partially disengaging the positioning device 70 so that the knife 56 can move to the non-cutting position N.

As shown in FIG. 11, when the control element 82 is in the C2 position shown in broken lines, the selection device 96 is rotated to the de-selection position in which the cam surface 97 pushes the selection lever 94 to the third position S3. The control element 82 then rotates forwards from the secondary position C2 to the primary position C1 through an intermediate position C4 shown in solid lines. In this intermediate position C4 the knife 56 is pushed to an intermediate position between the non-cutting position N and the cutting position C, for example around midway between the cutting position C and the non-cutting position N, which helps to remove any accumulated dirt from the slot 61 in the bottom plate 60.

When the control element 82 reaches the intermediate position C4 shown in solid lines in FIG. 11 the axes of the three pivot points X, Y, Z of the positioning device 70 and the selection lever 94 are aligned. In other words, the angle A is equal to 180°, where A is the angle formed between a line that connects the pivot points X, Y of the connecting element 90 and a line that connects the pivot points Y, Z of the selection lever 94. It is noted that the angle A changes as the control element 82 moves from the secondary position C2 to the primary position C1 owing to the fact that the pivot axis 88 of the control element 82 is offset from the pivot axis 72 of the positioning device 70.

As soon as the control element 82 rotates from the secondary position C2 past the intermediate position C4 towards the primary position C1 that is shown in chain lines in FIG. 11, the angle A increases from less than 180° at C2, to more than 180° between C4 and C1 because the pivot axis 88 of the control element 82 is offset from the pivot axis 72 of the positioning device 70. The compressed connecting element 90 then causes the selection lever 94 to flip over to the second position S2 shown in FIG. 13. As a result, the positioning device 70 is not fully supported anymore allowing the knife 56 to fall or be pressed by bale material towards the non-cutting position N shown in broken lines in FIG. 11.

FIG. 12 shows the selection lever 94' in an intermediate position as it flips over from the third position S3 to the second position S2. The positioning device 70 is in position P2 and is no longer supporting the knife 56, allowing the knife 56 to move towards the non-cutting position N.

FIG. 13 shows the selection lever 94 in the second position S2 and the control element 82 in the first position C1. The knife 56 is in the non-cutting position N.

The number of knives 54 that are in the cutting position C at any one time is typically selected according to the harvesting strategy employed by the user. For example, the type of animal that the crop will feed and how much power it is desirable to expend to cut the crop. The greater the number of knives 54, the shorter the length of individual crop pieces. With fewer knives 54 deployed to the cutting positions C there is less intensive cutting and the lengths of the crop stalks will be longer.

Figure 14:
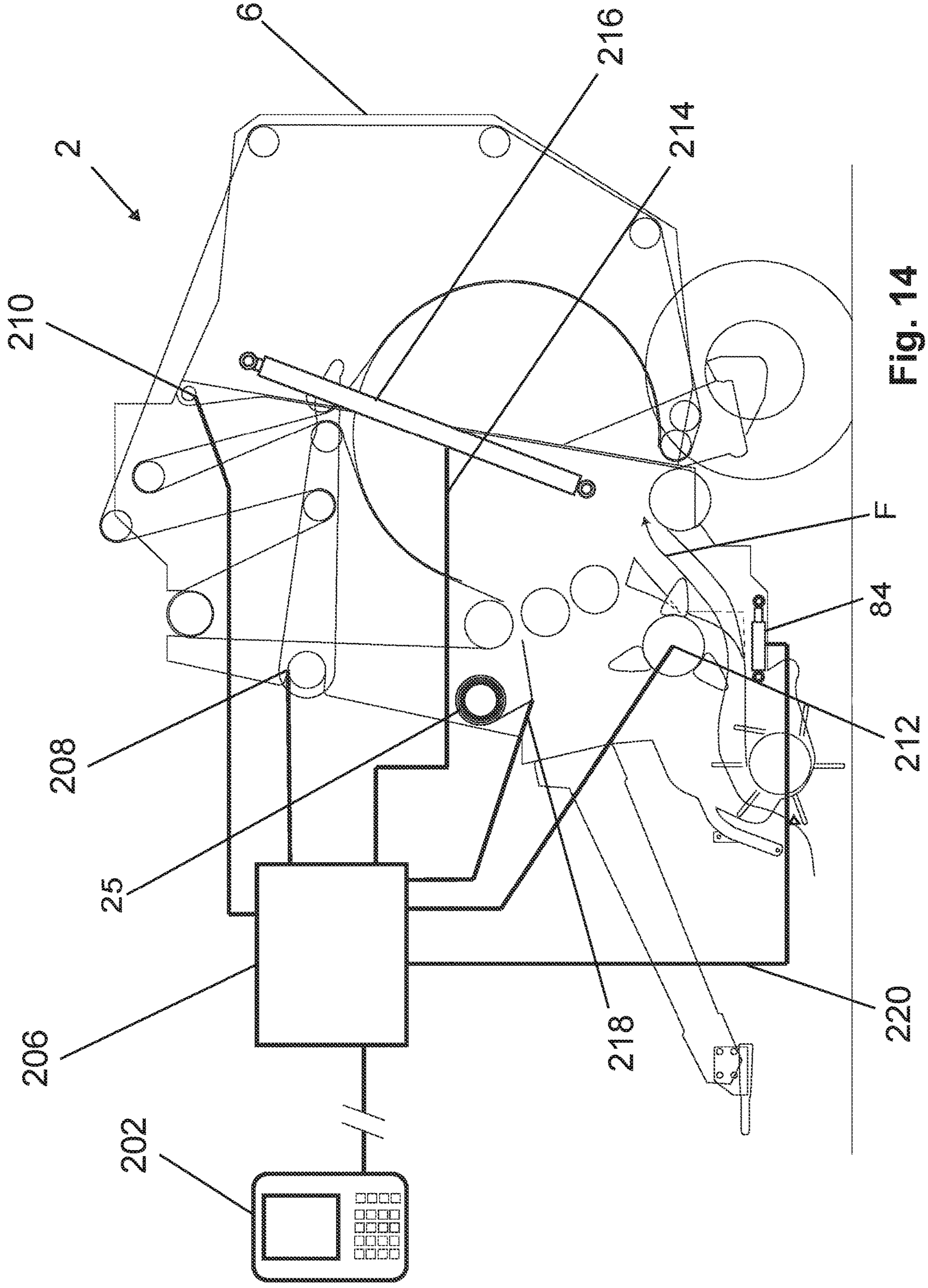
FIG. 14 is a schematic side section of a variable chamber round baler similar to FIG. 1, and additionally showing diagrammatically a control system for the baler.

FIG. 14 shows a control system 200. The control system 200 includes an input device 202 and a display 204, which are typically located in a tractor. The input device 202 enables the driver of the tractor to control operation of the baler 2 from the tractor, for example by selecting certain modes of operation and setting operating parameters.

The control system 200 includes a baler controller 206, which can include, for example at least one programmable logic controller (PLC). The baler controller 206 is arranged to control operation of the baler. For example, the controller 206 can be arranged to operate the first hydraulic cylinder 84 to actuate the control element. The controller 206 can be arranged to operate the selection mechanism 92. The controller 206 can be arranged to operate the binding device 25.

The control system 200 includes a line 220 that connects the baler controller 206 to the actuator 84. The baler controller 206 is arranged to control operation of the actuator 84 by sending control signals to the actuator 84 via the line 220. For example, when the baler controller 206 determines from the input signals received from the input device 202, or due to any other determination such as those described below, that the position of the control element 82 is to be adjusted, the actuator 84 is configured to move the control element 82 between a primary position C1 and a secondary position C2.

The control system includes a bale size sensor 208 that is arranged to detect the size of the bale B located within the baling chamber 14. The bale size sensor 208 is connected to the baler controller 206, and provides an input signal to the baler controller 206, and the baler controller 206 is able to determine the size of the bale B in the baling chamber 14 according to the signals received from the bale size sensor 208. In some embodiments, the controller 206 is arranged to actuate the control element 84 and/or selection mechanism 96 to undertake a knife cleaning operation in response to signals received from the bale size sensor 208.

The control system includes a tailgate sensor 210 that is arranged to detect the position of the tailgate 6, for example the tailgate sensor 210 can comprise a switch, such as a limit switch. The tailgate sensor 210 is connected to the baler controller 206, and provides an input signal to the baler controller 206, and the baler controller 206 is able to determine the rotational orientation of the tailgate 6 with respect to the fixed part 4*a* according to the signals received from the tailgate sensor 210. In some embodiments, the controller 206 is arranged to actuate the control element 84 and/or selection mechanism 96 to undertake a knife cleaning operation in response to signals received from the tailgate sensor 210.

The control system includes a crop material sensor 212 that is arranged to detect the flow F of crop material entering the baling chamber 14. The crop material sensor 212 is connected to the baler controller 206, and provides an input signal to the baler controller 206, and the baler controller 206 is able to determine the flow rate of crop material entering the baling chamber 14 according to the signals received from the crop material sensor 212. In some embodiments, the controller 206 is arranged to actuate the control element 84 and/or selection mechanism 96 to undertake a knife cleaning operation in response to signals received from the crop material sensor 212.

The control system 200 includes a line 214 that connects the baler controller 206 to a tailgate cylinder 216. A first end of the tailgate cylinder 216 is connected to the tailgate 6 at a first pivot connection 216*a* and a second end of the tailgate cylinder 216 is connected to the frame 3 at a second pivot connection 216*b*. The baler controller 206 is arranged to control operation of the tailgate cylinder 216 to open and close the baler 2 by sending control signals to the tailgate cylinder 216 via the line 214. For example, when the baler controller 206 determines from the input signals received from the bale size sensor 208 that the bale B has reached a threshold size, the baler controller 206 can be arranged to issue a control signal to the tailgate cylinder 216 to automatically open the tailgate 6, to enable the bale B to be ejected from the baling chamber 14. When the baler controller 206 determines that the bale B has been ejected from the baling chamber 14, the baler controller 206 issues a control signal to the tailgate cylinder 216, via line 214, to close the tailgate 6. In some embodiments, the controller 206 is arranged to actuate the control element 84 and/or selection mechanism 96 to undertake a knife cleaning operation in response to determining that the bale has been released from the baling chamber 14.

The control system 200 includes a line 218 that connects the baler controller 206 to the binding device 25. The baler controller 206 is arranged to control operation of the binding device 25 to bind the bale B in the baling chamber 14 by sending control signals to the binding device 25 via the line 218. For example, when the bale controller 206 determines from the input signals received from the bale size sensor 208 that the bale B has reached a threshold size, the baler controller 206 can be arranged to operate the binding device 25 to insert binding material into the baling chamber 14 to bind the bale B. In some embodiments, the controller 206 is arranged to actuate the control element 84 and/or selection mechanism 96 in response to the binding device operating.

Figure 15:
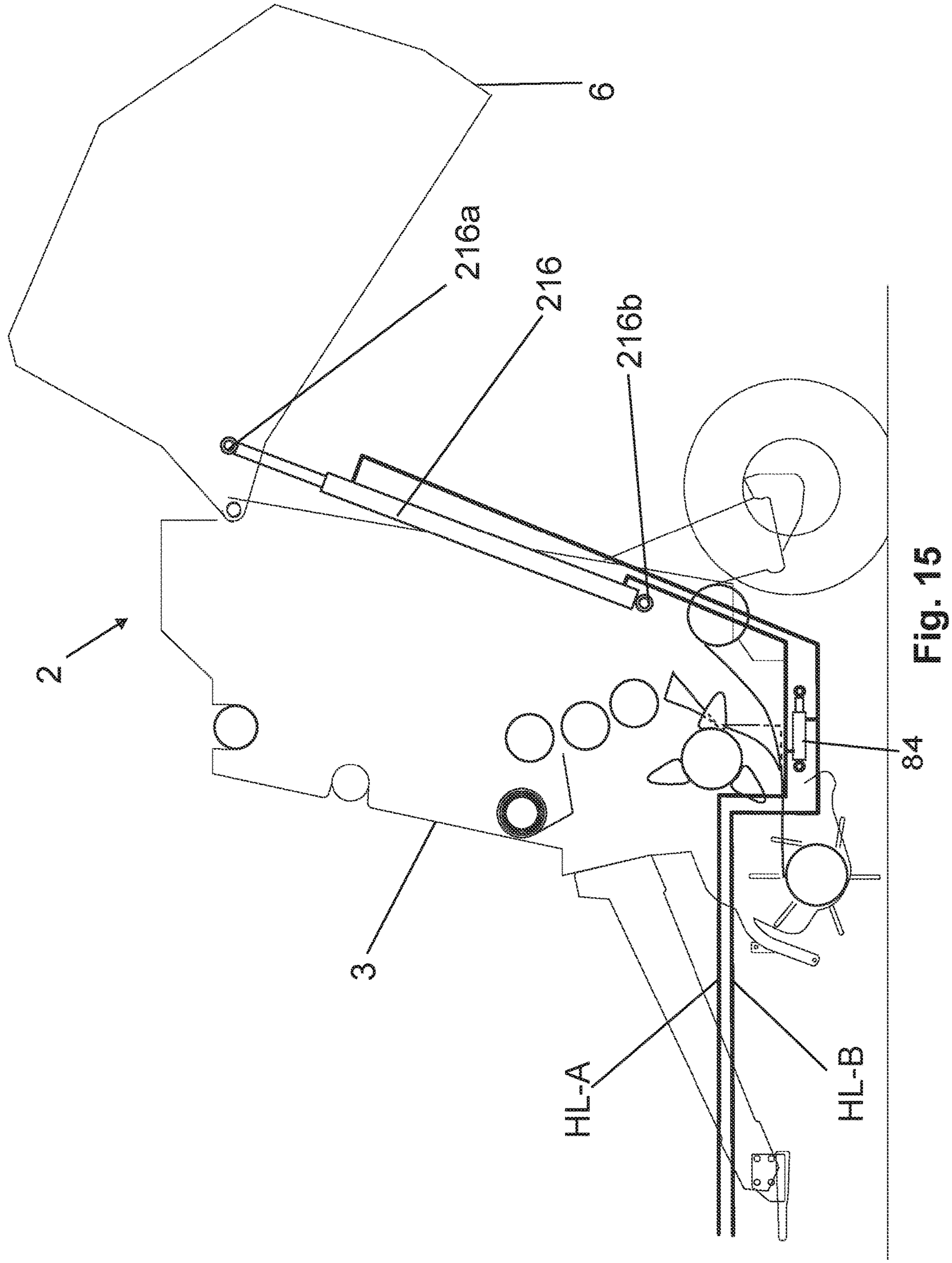
FIG. 15 is a schematic side section of a variable chamber round baler similar to FIG. 1, with the tailgate open.

As shown in FIG. 15, the tailgate cylinder 216 is connected to a hydraulic line HL-A and to a hydraulic line HL-B. The actuator 84 is connected to the hydraulic line HL-A and hydraulic line HL-B. When hydraulic line HL-A is pressurised by the tractor, the tailgate 6 is closed and at least some of the knives 56 are moved to the cutting position, that is the control element 82 is moved to the primary position C1 by the actuator 84. When hydraulic line HL-B is pressurised by the tractor, the tailgate 6 is opened and at least some of the knives 56 are moved into the non-working position, that is the control element 82 is moved to the secondary position C2 by the actuator 84.

FIGS. 16 to 23 show further details of the cutter device 40. In particular, FIGS. 16 to 23 show that the cutter device 40 includes a sub-assembly 300 (sometimes referred to as a cassette), which is moveable between a working position, in which the cutter device operates normally as described above, and a maintenance position (see FIGS. 18 and 19), where it is possible to perform maintenance on some components of the cutter device 40.

The cutter device 40 includes a bottom wall comprising first, second and third bottom plates 60,63,65. The bottom wall defines the crop feed path F. The first bottom plate 60 is located beneath the rotor 42 in a working condition. The crop feed path F is located between the rotor 42 and the first bottom plate 60. The second bottom plate 63 is located in front of the first bottom plate 60 in the crop material flow direction. The third bottom plate 65 which is located behind the first bottom plate in the crop material flow direction. In this arrangement, the second and third bottom plates 63,65 are fixed to the support frame 305, and the first bottom plate 60 is moveable laterally with respect to the second and third bottom plates 63,65, as will be apparent from the description below.

The sub-assembly 300 includes at least the first bottom plate 60, which includes the slots 61 through which respective knives 56 protrude. The sub-assembly includes a first support member 302 and a second support member 304, which are arranged to support the first bottom plate 60. The first support member 302 comprises a first beam which is arranged perpendicularly with respect to the direction of movement of the baler 2. The first support member 302 extends longitudinally along the first bottom plate 60 and is fixed thereto. Typically, the first support member 302 is located on an underside of the first bottom plate 60 and is located towards a rear longitudinal edge the first bottom plate 60. The second support member 304 comprises a second beam which is arranged perpendicularly with respect to the direction of movement of the baler 2. The second support member 304 extends longitudinally along the first bottom plate 60 and is fixed thereto. Typically, the second support member 304 is located on an underside of the first bottom plate 60 and is located towards a front longitudinal edge of the first bottom plate 60.

Since the first and second support members 302, 304 are fixed to the first bottom plate 60 they are arranged to move with the first bottom plate 60, and they provide a frame for the sub-assembly 300. Typically, the first support member 302 is arranged parallel with at least one of the control element 82 and the pivot shaft 62. Typically, the second support member 304 is arranged parallel with at least one of the control element 82 and the pivot shaft 62.

The sub-assembly 300 includes the pivot shaft 62 and the handle 102, which is arranged to rotate the pivot shaft 62. Typically, the pivot shaft 62 is arranged is arranged parallel with the control element 82.

The sub-assembly 300 includes the knives 56 which are located in the slots 61 formed through the bottom plate 60. As described above, each knife 56 is attached to the pivot shaft 62, via a slot 58 and hole 57.

The baler frame 3 is arranged to support the cutting device 10 above the ground.

Figure 16:
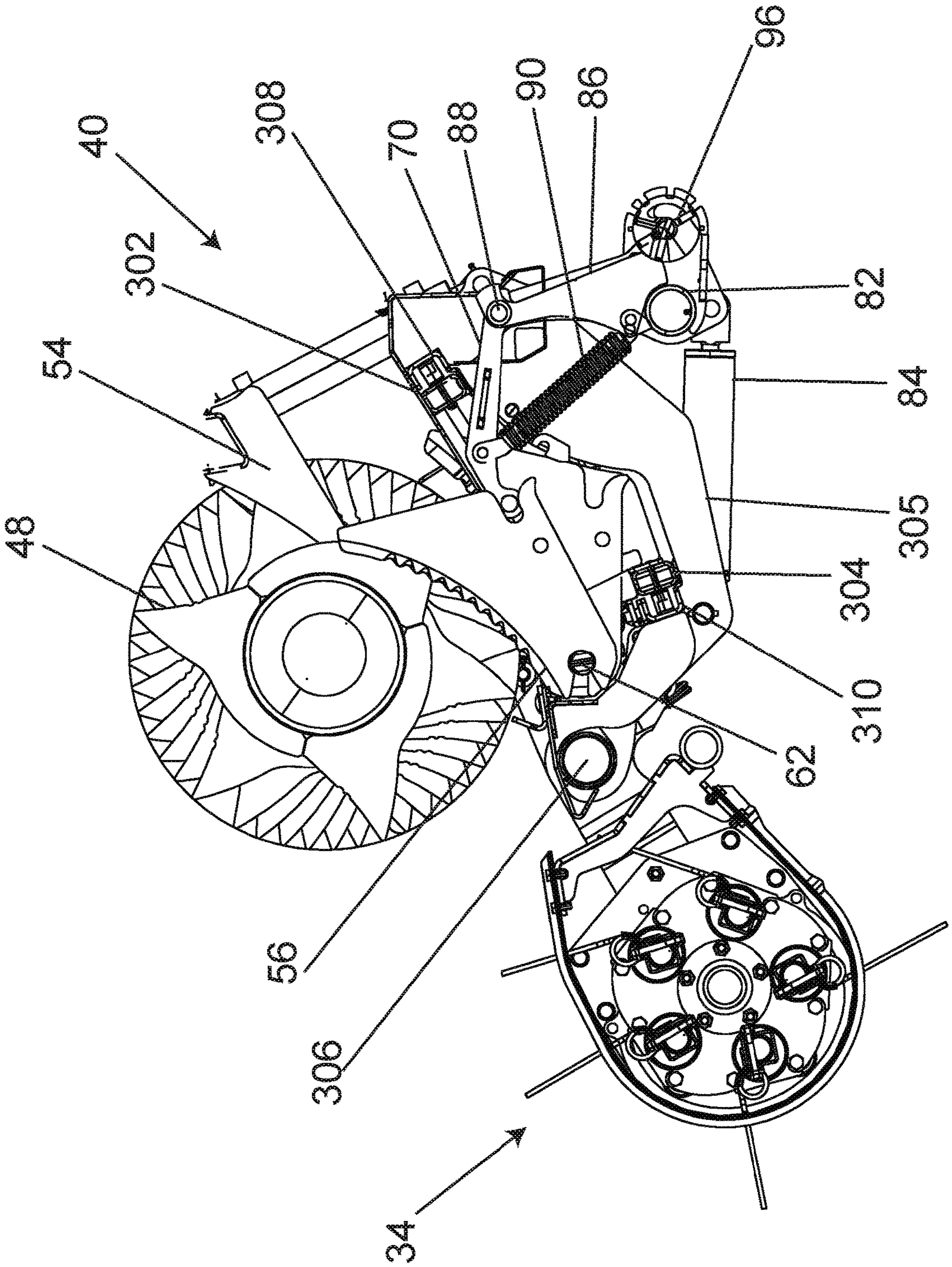
FIG. 16 is a side/section view of part of the pickup and cutter unit of FIG. 2, having a moveable cassette, wherein the cassette is in a working position.
Figure 17:
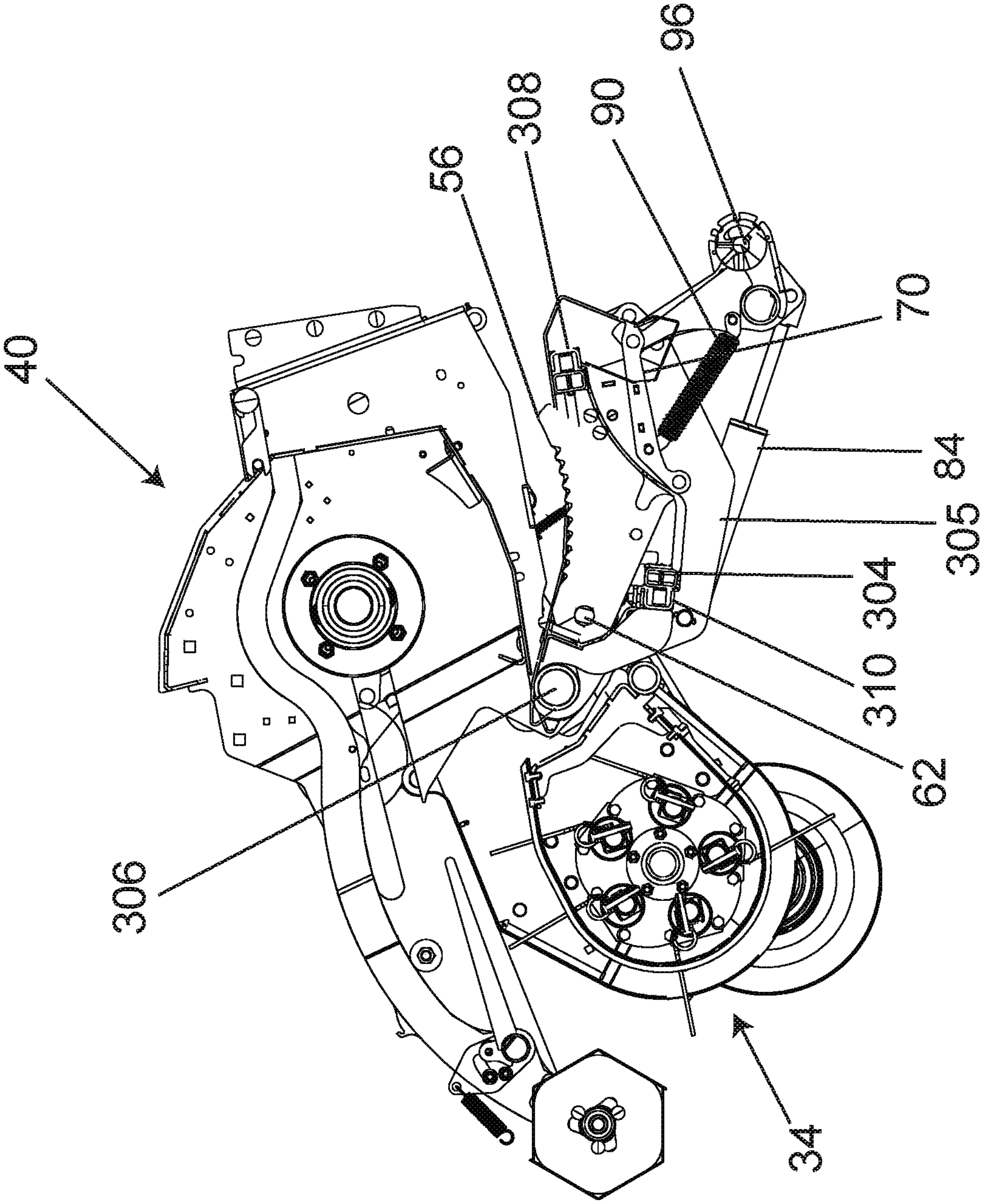
FIG. 17 is a side view of part of the pickup and cutter unit of FIG. 2, wherein the cassette is in the working position and the support frame is in lowered position.
Figure 18:
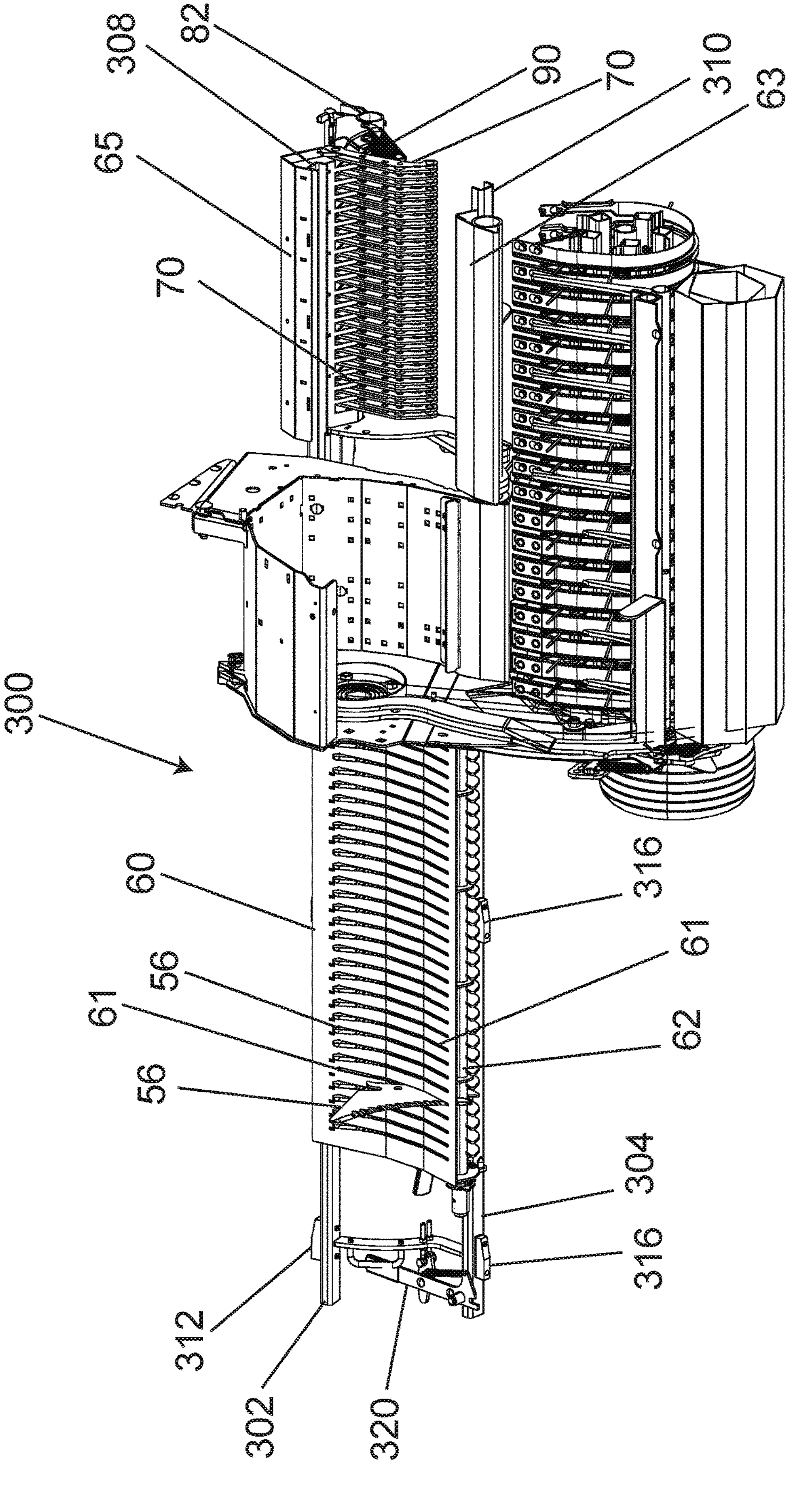
FIG. 18 is an isometric view of part of the pickup and cutter unit of FIG. 2, with the cassette in a maintenance position.
Figure 19:
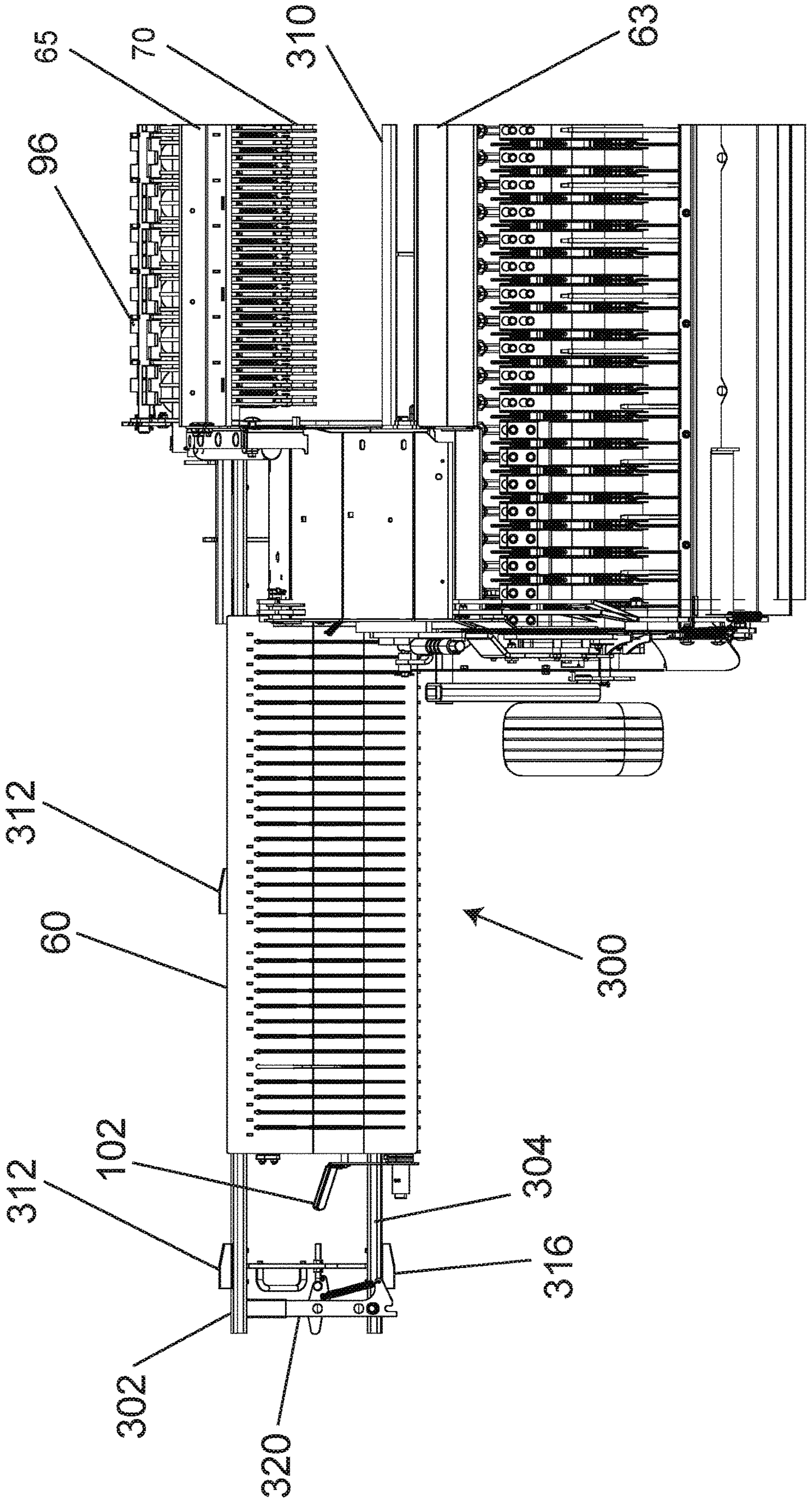
FIG. 19 is a plan view from above of part of the pickup and cutter unit of FIG. 2, with the cassette in the maintenance position.
Figure 20:
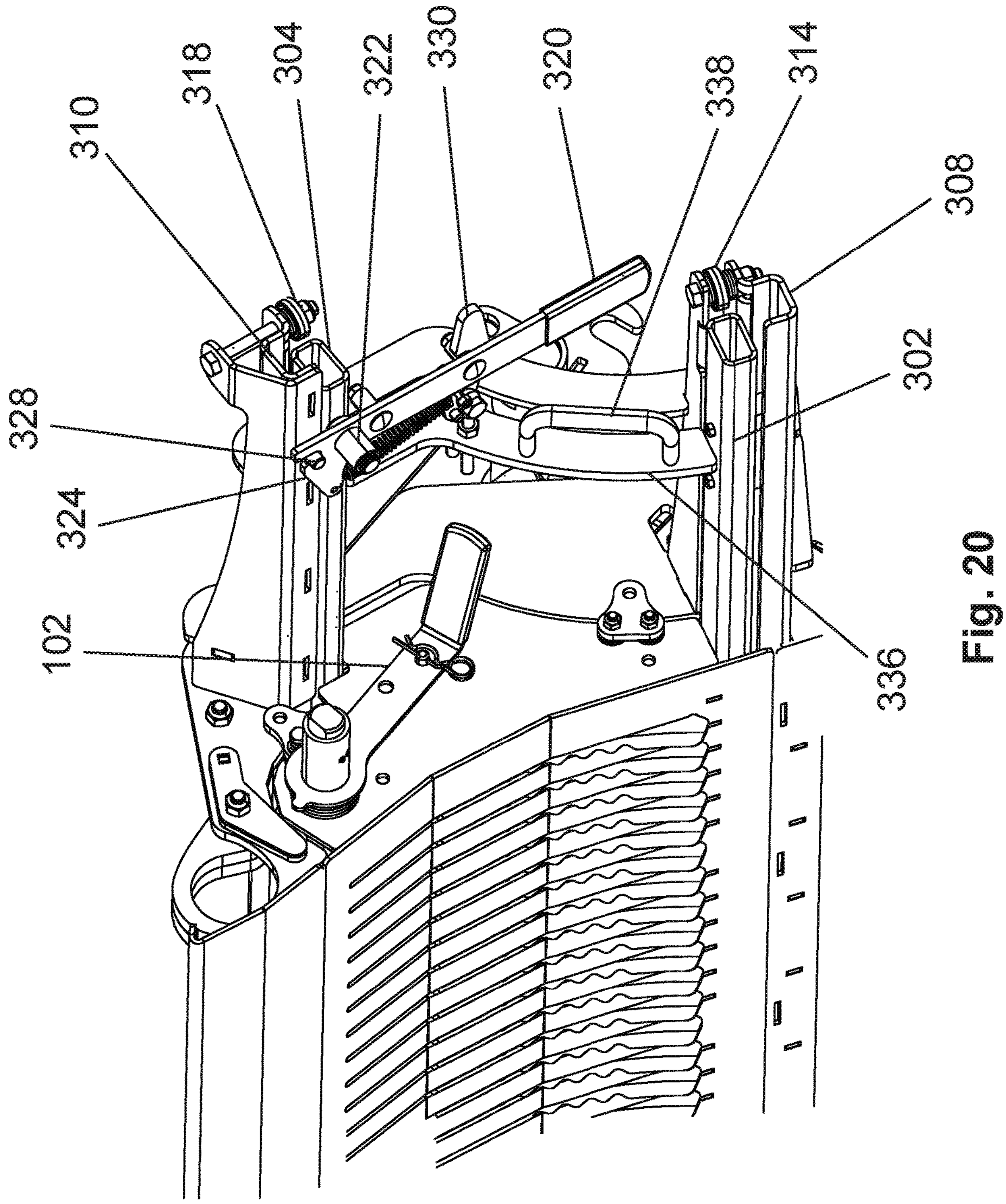
FIG. 20 is an enlarged isometric view of part of the pickup and cutter unit of FIG. 2, showing a locking handle that is arranged to fix the position of the cassette in the working position and to release the cassette for movement to the maintenance position.
Figure 21:
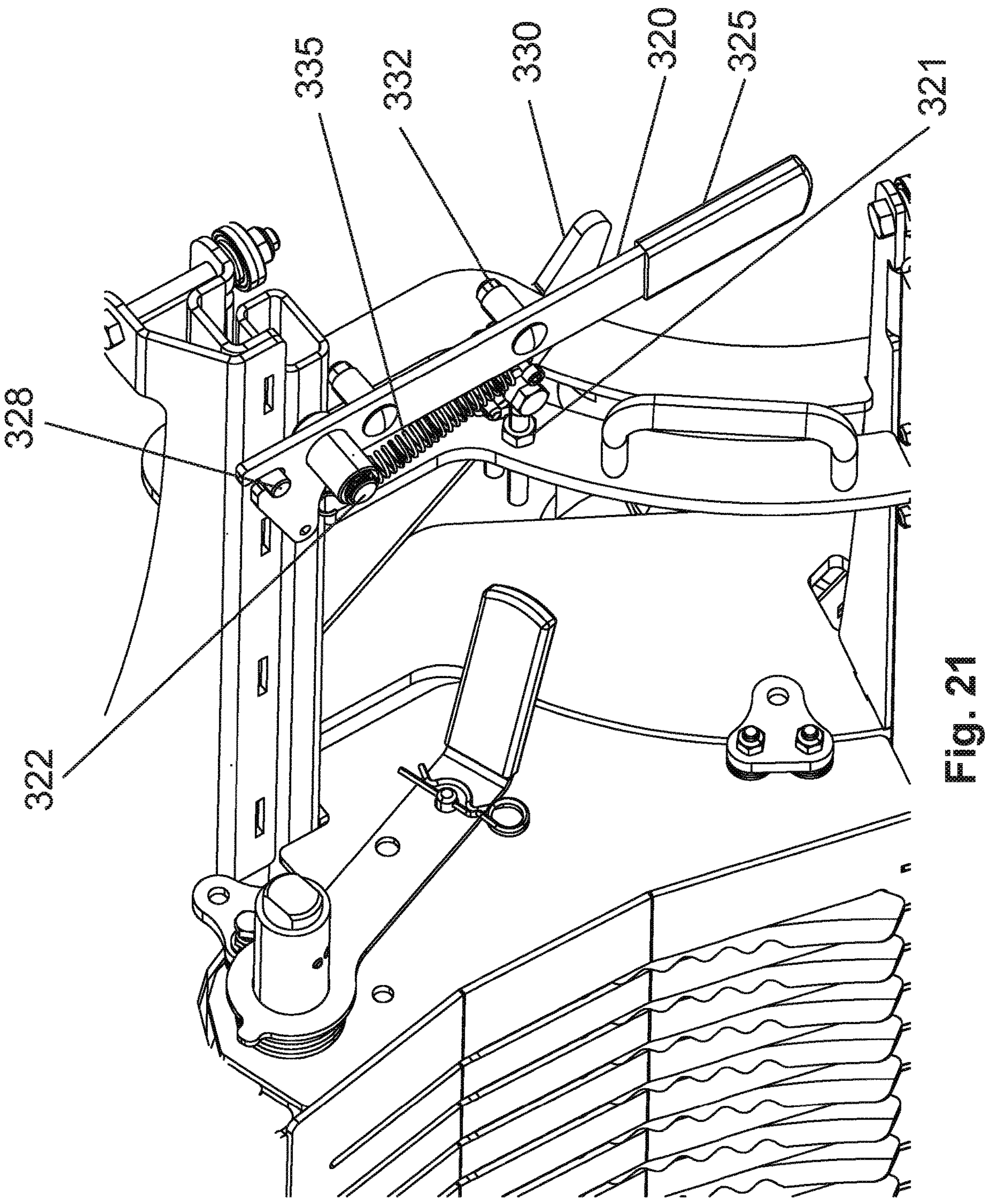
FIG. 21 is similar to FIG. 20, except that a latch which maintains the position of the locking handle is in a non-locking position.
Figure 22:
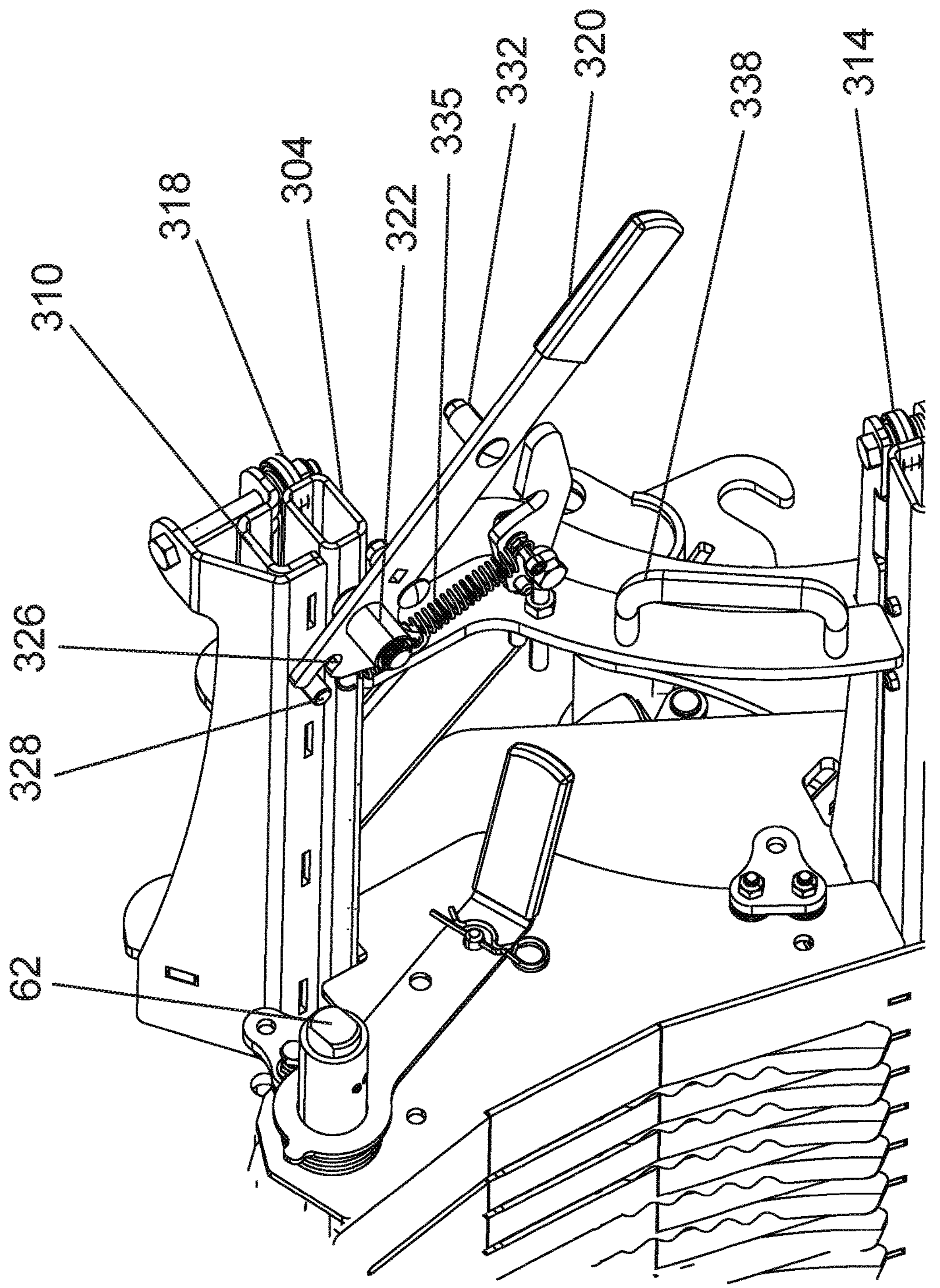
FIG. 22 is similar to FIG. 21, except that the locking handle is moved to a position wherein the cassette is unlocked and is moveable to the maintenance position.
Figure 23:
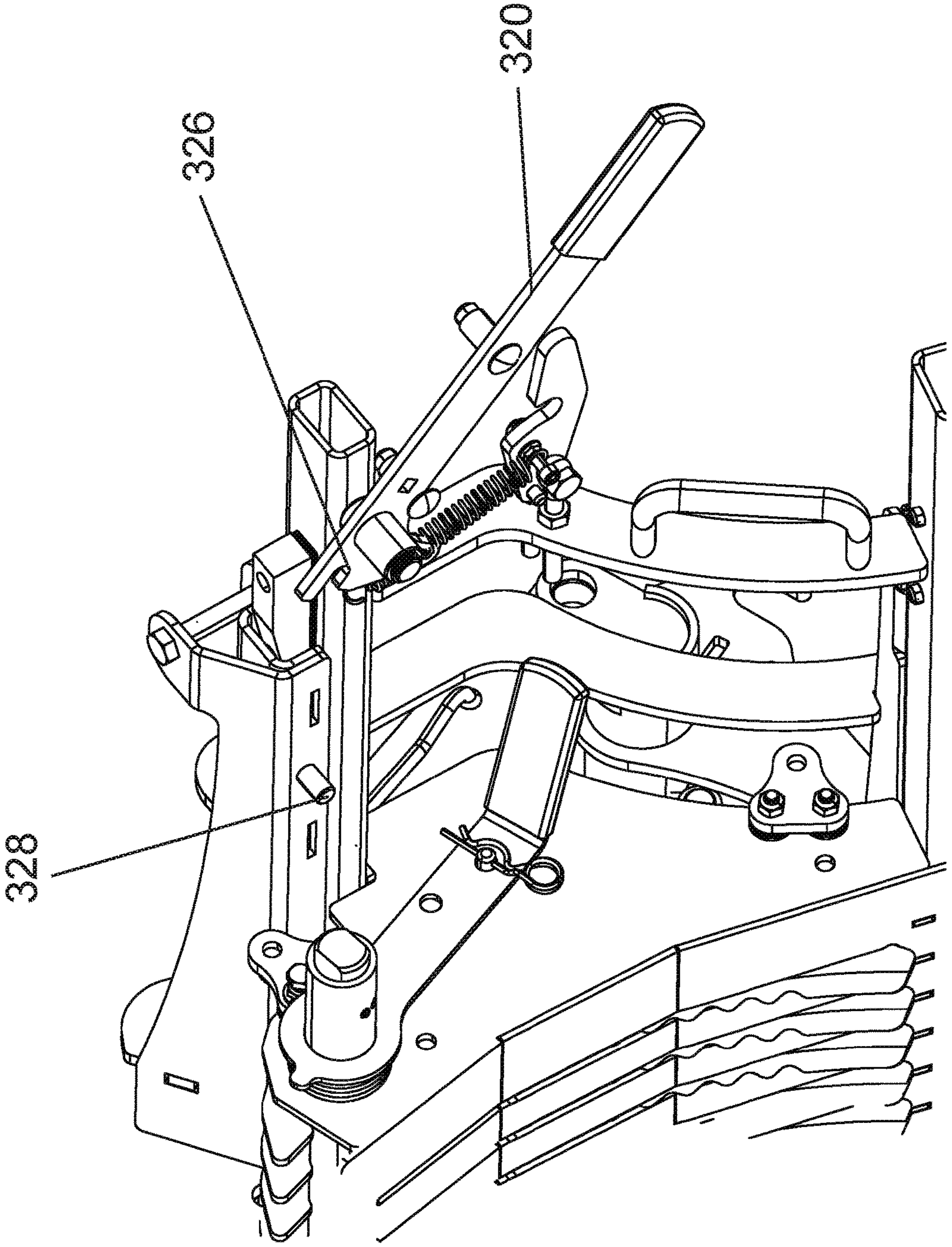
FIG. 23 is similar to FIG. 22 except that the cassette has moved away from the locking handle in the direction towards the maintenance position.

A pivotal cutter device support frame 305 is pivotable relative to the baler frame 3 about pivot 306 in order to remove blockages in the feed path and to provide sufficient space for the sub-assembly 300 to move laterally (see FIGS. 16 and 17).

The support frame 305 includes first and second guide rails 308,310. The first guide rail 308 is arranged adjacent the first support member 302, and is arranged parallel to the first support member 302. The first support member 302 is arranged to move relative to the first rail 308 in a longitudinal direction of the first rail. The first support member 302 includes a number of guide elements 312 that are arranged to engage the first guide rail 308, and to guide movement of the sub-assembly 300 as it is moved between the working and maintenance positions. Typically, at least some of the guide elements 312 support and position the sub-assembly 300 when the sub-assembly 300 is in the working position.

A first roller element 314 is attached to the support frame 305, for example can be mounted on the first rail 308 or adjacent thereto. The first roller element 314 is arranged to engage with the first support 302, and enables the sub-assembly 300 to be rolled between the working and maintenance positions. Typically, the roller element 314 supports the sub-assembly 300 as it moves laterally and whereby at least some of the guide support elements 312 lose contact, at least vertically, with the guide rail 308. In some embodiments, the cutter device can include a plurality of first roller elements 314.

The second rail 310 is arranged adjacent to the second support member 304 and is arranged parallel to the second support member 304. The second support member 304 is arranged to move relative to the second guide rail 310 in a longitudinal direction of the second guide rail. The second support member 304 includes a number of guide elements 316 that are arranged to engage the second guide rail 310 and to guide movement of the sub-assembly 300 as it is moved between the working and maintenance positions. Typically, at least some of the guide elements 316 support and position the sub-assembly 300 when the sub-assembly 300 is in the working position.

A second roller element 318 is attached to the support frame 305, for example can be mounted on the second rail 310 or adjacent thereto. The second roller element 318 is arranged to engage with the second support 304, and enables the sub-assembly 300 to be rolled between the working and maintenance positions. Typically, the second roller element 318 supports the sub-assembly 300 as it moves laterally and whereby at least some of the guide support elements 316 lose contact, at least vertically, with the second guide rail 310. In some embodiments, the cutter device can include a plurality of second roller elements 316.

The cutter device 40 includes a locking device, which is arranged to fix the position of the sub-assembly 300 with respect to the support frame 305. The locking device includes a locking handle 320 that is arranged to selectively lock the position of the sub-assembly 300 with respect to the support frame 305. For example, the locking handle 320 can be moved to a locking position in order to lock the sub-assembly 300 in the working position to enable the cutter device to function normally. The locking handle 320 can be moved to a non-locking position, which enables the sub-assembly 300 to move relative to the support frame 305, and in particular relative to the first and second rails 308,310. Preferably, the sub-assembly 300 includes the locking handle 320. In other embodiments, the locking handle 320 can be located on the support frame 305.

In one arrangement, the locking handle 320 is pivotally attached to the second support member 304 via a pivot pin 322. The locking handle 320 is elongate. The pivot pin 322 is located towards a first end 324 of the locking handle 320. The distance between the first end 324 of the handle 320 and the pivot pin 322 is significantly shorter than the distance between the pivot pin 322 and a second end 325 of the handle 302. The user grips the handle 320 towards the second end. This provides a mechanical advantage when operating the handle 320, as is described below. A slot 326 is formed in the first end of the locking handle. The slot 326 is arranged to engage with a locking formation such as a locking pin 328 that protrudes from the support frame 305, and preferably from the second guide rail 310. When the locking handle 320 engages the locking formation, for example the locking pin 328, the locking formation is located in the slot 326, the sub-assembly 300 is fixed to the support frame 305 and is unable to move relative to the first and second rails 308,310. When the locking handle 320 disengages the locking formation, for example the handle 320 is operated to remove the locking pin 328 from the slot 326, whereby the sub-assembly 300 is moved latterly and preferably at least some of the guiding elements 312,316 lose contact, at least vertically, with their respective guide rails 308,310 when the slot 326 is leaving the locking pin 328. The sub-assembly 300 is moveable relative to the support frame 305, for example the sub-assembly 300 is moveable relative to the first and second rails 308,310 from the working position to the maintenance position. Disengaging the locking handle 320 from the locking formation 328 has the effect of adjusting the position of the sub-assembly 300 a little relative to the first and second guide rails 308,310 and thereby moves the first and second support members 302,304 into contact with the first and second roller elements 314,318 respectively. The sub-assembly 300 is then ready to be pulled out further to the maintenance position. Having the sub-assembly 300 mounted on the roller elements 314,318 enables the sub-assembly 300 to be moved laterally more easily.

Typically, the locking pin 328 is located adjacent a first end 310*a* of the second rail 310 and facilitates locking the sub-assembly 300 in the working position.

When the locking handle 320 is operated, the locking handle 320 interacts with the locking pin 328 in order to initiate lateral movement of the sub-assembly 300 relative to the support frame 305, say by several centimetres, and to lift the sub-assembly 300 on to the roller elements 314,318. The invention makes use of the mechanical advantage of the handle 320, which functions as a lever pivoting about a fulcrum to multiply the input force applied to the handle 320 by the user to a larger output force delivered to the sub-assembly 300 by the handle 320. The output force applies a component of force to the sub-assembly 300 in the lateral direction, which is sufficient to overcome any frictional forces between the guide elements 312,316 and their respective guide rails 308,310, and to lift the sub-assembly into contact with the roller elements 314,318.

Optionally, the cutter device 40 can include a latching arrangement for locking the position of the locking handle 320. For example, the cutter device 40, and preferably the sub-assembly 300, can include a latch 330, a latching member 332, and a spring 335. The latch 330 is pivotable about a pivot pin 334 and is arranged to selectively engage the latching member 332. The spring 335 is arranged to bias the latch 332 towards engagement with the latching member 332, to hold the latch 330 in engagement with the latching member 332. Typically, the latching member 332 protrudes outwards from the locking handle 320. When the latch 330 engages the latching member 332, the locking handle 320 is locked in place and cannot be pivoted about pivot pin 322. Thus the latching arrangement is arranged to prevent the locking handle 320 from accidently disengaging the pin 328, when the sub-assembly 300 is in the working position. Thus the latching arrangement provides an extra layer of safety.

The latch 330 can be manually operated by a user to disengage the latching member 332, thereby enabling the locking handle 320 to be operated to disengage the locking formation.

The locking device includes an adjustment mechanism 321. The adjustment mechanism is arranged to adjust the locking position of the sub-assembly 300 with respect to the support frame 305, and hence the frame 3, thereby adjusting the positions of the knives 56 with respect to at least one of the rotor 42 and the positioning devices 70 to ensure proper alignment. The adjustment mechanism 321 includes an adjustable screw element. The adjustment mechanism adjusts the locking position by adjusting the position of the latch 330, which adjusts the position of the locking handle 320, which in turn acts on the pivot 322 and hence the second support member 304, to adjust the lateral position of the sub-assembly 300 with respect to the frame.

The sub-assembly 300 includes a transverse frame member 336, which is connected at a first end thereof to the first support member 302 and at a second end thereof to the second support member. The transverse member 336 connects to the first and second support members 302,304, towards first ends of the first and second support members 302,304.

A handle 338 is attached to the transverse frame member 336. The handle 338 is provided to enable a user to pull the sub-assembly 300 from the working position towards the maintenance position. The user can push on the handle 338 to push the sub-assembly towards the working position.

It will be clear from the above description that the sub-assembly 300 includes the first bottom plate 60 having slots 61, knives 56, the first and second support members 302,304 and the pivot shaft 62. However it should be noted that the sub-assembly 300 does not include the positioning devices 70, resilient members 90, the control element 82 nor the selection mechanism 92. When the sub-assembly 300 moves, the positioning devices 70, resilient members 90, control element and the selection mechanism 92 all remain attached to the support frame 305 in the working position. Therefore, before the sub-assembly 300 can be moved from the working position to the maintenance position, each positioning device 70 disengages its respective knife 56, for example by disengaging the first engaging formation 74 at the front end of the positioning device 70 from the complementary second engaging formation 76 provided towards the rear end of the knife 56. This ensures that when the locking handle 320 disengages the locking formation 328, the sub-assembly 300 is free to move relative to the support frame 305, leaving the positioning devices 70, resilient members 90, control element 82 and the selection mechanism 92 in place on the support frame 305. Thus the positioning devices 70, resilient members 90, control element 82 and the selection mechanism 92 remain attached to the frame 305 when the sub-assembly 300 is moved to the maintenance position.

Since the first and second guide rails 308,310 and the first and second support members 302,304 are arranged perpendicularly to the direction of travel of the baler, it will be appreciated that when the sub-assembly 300 if moved out of the working position to the maintenance position, the sub-assembly 300 moves in a transverse direction and protrudes out of a lateral side of the baler. Thus the longitudinal direction of the sub-assembly 300 is perpendicular to the longitudinal direction of the baler.

Thus the sub-assembly 300 is arranged to move in a first lateral direction from the working position to the maintenance position (see FIGS. 18 and 19), and to move in a second lateral direction, which is opposite to the first lateral direction, from the maintenance position to the working position. Typically, the sub-assembly 300 slides with respect to the guide rails 308,310, at least when moving initially from the working position, and hence slides with respect to the support frame 305. Typically, the sub-assembly 300 is carried by rollers in the guide rails 308,310 for subsequent movement to the maintenance position.

It will also be appreciated that when the sub-assembly 300 is moved laterally, the first bottom plate 60 having slots 61, knives 56, the first and second support members 302,304 and the pivot shaft 62 move in the transverse direction as a unit.

The cutter device 40 according to the invention can be used on any suitable agricultural harvester such as a round baler variable chamber, or fixed chamber, square baler, or loading wagon.

The invention claimed is:

1. A cutter device for an agricultural harvester, comprising:

- a rotor with a plurality of tines, wherein the rotor is rotatable to transfer an agricultural crop along a feed path;
- a sub-assembly including:
  - a pivot shaft;
  - a knife, wherein a position of the knife is adjustable between (i) a cutting position in the feed path in which the knife cooperates with the rotor to cut the crop, and (ii) a non-cutting position in which the knife is withdrawn from the feed path, wherein the knife includes an engagement formation located towards a front end of the knife that is arranged to engage the pivot shaft;
  - a first bottom plate located beneath the rotor in a working condition, wherein the feed path is located between the rotor and the first bottom plate, and the first bottom plate includes an opening through which the knife extends in the cutting position;
- a support frame;
- a positioning device mounted to the support frame, wherein the positioning device is arranged to control movement of the knife between the cutting position and the non-cutting position, and to selectively disengage the knife to allow movement of the knife relative to the positioning device;
- a control mechanism mounted to the support frame, wherein the control mechanism is arranged to control movement of the positioning device;

wherein the sub-assembly is moveably mounted to the support frame and is arranged to move relative to the support frame in a lateral direction that is transverse to a forward moving direction of the cutter device between i) a working position in which the sub-assembly is aligned with the support frame in a manner that enables the knife to be engageable by the positioning device, and ii) a maintenance position in which the knife is laterally spaced apart from the positioning device and the sub-assembly protrudes laterally outwards from the support frame.

2. The cutter device according to claim 1, wherein the support frame includes a first guide rail and the sub-assembly is arranged to move relative to the first guide rail.

3. The cutter device of claim 2, wherein the cutter device includes a first roller element for guiding movement of the sub-assembly relative to the first guide rail.

4. The cutter device of claim 2, including at least one first guide element that is arranged to guide movement of the sub-assembly relative to the first guide rail.

5. The cutter device of claim 2, wherein the support frame includes a second guide rail and the sub-assembly is arranged to move relative to the second guide rail.

6. The cutter device of claim 5, wherein the cutter device includes a first roller element for guiding movement of the sub-assembly relative to the first guide rail and a second roller element for guiding movement of the sub-assembly relative to the second guide rail.

7. The cutter device of claim 5, including at least one second guide element that is arranged to guide movement of the sub-assembly relative to the second guide rail.

8. The cutter device of claim 2, wherein the first guide rail is a rear guide rail that is positioned behind the knife and the opening in the first bottom plate, to enable crop material to flow freely through at least part of the opening in order for the knife to fall through the opening to a position that enables the sub-assembly to move laterally.

9. The cutter device of claim 1, wherein the knife engagement formation engaging the pivot shaft, and any contact with the first bottom plate, alone supports the knife vertically while the sub-assembly moves laterally relative to the support frame.

10. The cutter device of claim 1, including a locking device arranged to fix a position of the sub-assembly with respect to the support frame.

11. The cutter device of claim 10, wherein the locking device is arranged to fix the position of the sub-assembly with respect to the support frame in the working position.

12. The cutter device of claim 11, wherein the cutter device includes an adjustment mechanism arranged to adjust the position at which the sub-assembly is fixed with respect to at least one of the cutting rotor and the positioning device.

13. The cutter device of claim 12, wherein the locking device comprises a pivotable locking handle which is arranged to selectively engage a locking formation to fix the position of the sub-assembly with respect to the support frame, and the adjustment mechanism is arranged to adjust a locking position of the locking handle to adjust the position at which the sub-assembly is fixed with respect to at least one of the cutting rotor and the positioning device.

14. The cutter device of claim 13, wherein the cutter device includes a locking handle pivot pin, the adjustment mechanism is arranged to adjust a position of the locking handle pivot pin with respect to the support frame to adjust the position at which the sub-assembly is fixed with respect to at least one of the cutting rotor and the positioning device.

15. The cutter device of claim 10, wherein the locking device comprises a pivotable locking handle which is arranged to selectively engage a locking formation to lock the position of the sub-assembly with respect to the support frame.

16. The cutter device of claim 15, wherein movement of the locking handle in cooperation with the locking formation on the support frame is arranged to cause the sub-assembly to move in the lateral direction.

17. The cutter device of claim 16, wherein the cutter device includes at least one first guide element, the support frame includes a first guide rail and the sub-assembly is arranged to move relative to first guide rail, the at least one first guide element is arranged to guide movement of the sub-assembly relative to the first guide rail and the at least one first guide element is arranged to lose contact with the first guide rail in response to the locking handle unlocking the sub-assembly from the support frame.

18. The cutter device of claim 15, wherein the locking handle comprises a lever arranged to deliver an output force to the sub-assembly to move the sub-assembly laterally relative to the support frame and to engage the sub-assembly with at least one roller element.

19. The cutter device of claim 1, wherein the knife is pivotable about the pivot shaft.

20. The cutter device of claim 19, wherein the pivot shaft and the knife have complementary locking formation that lock the knife to the pivot shaft in a first configuration and allow separation of the knife from the pivot shaft in a second configuration.

21. The cutter device of claim 20, wherein the pivot shaft and the knife are adjustable between the first configuration and the second configuration by relative rotation of the knife and the pivot shaft.

22. The cutter device of claim 1, wherein the positioning device is configured to engage the knife at a location towards a rear part of the knife.

23. The cutter device of claim 1, wherein the positioning device and the knife have complementary engaging formations configured to maintain engagement between the positioning device and the knife in a first position of the positioning device in which the knife is located in the cutting position, a second position of the positioning device in which the knife is located in the non-cutting position, and all intermediate positions of the positioning device in between the first position of the positioning device and the second position of the positioning device, and to permit disengagement of the positioning device from the knife in a third position of the positioning device.

24. The cutter device of claim 23, wherein the engaging formations are configured to limit relative movement between the positioning device and the knife in a tangential direction relative to a pivot axis of the knife, and to permit relative movement between the positioning device and the knife in a radial direction relative to the pivot axis of the knife.

25. The cutter device of claim 24, wherein the positioning device is configured to disengage the knife in the third position.

26. The cutter device of claim 25, wherein the engaging formations comprise a rearwards-facing slot that opens through a rear edge of the knife and an engaging element provided on the positioning device that engages the slot.

27. The cutter device of claim 26, wherein the rearwards-facing slot extends substantially in a direction of the pivot axis of the knife.

28. The cutter device of claim 1, wherein the positioning device is pivotable about a pivot axis of the positioning device, which is located towards a rear end of the positioning device.

29. The cutter device of claim 1, wherein the cutter device includes a further knife, wherein the first bottom plate includes a further opening, and the further knife is arranged to extend into a further cutting position through the further opening.

30. The cutter device of claim 29, including a further positioning device mounted on the support frame, wherein the further positioning device is arranged to control movement of the further knife between the further cutting position and a further non-cutting position, and to selectively disengage the further knife to allow movement of the further knife relative to the further positioning device, wherein the control mechanism is arranged to control movement of the further positioning device.

31. The cutter device of claim 30, wherein the further knife is configured to move between the further cutting position and the further non-cutting position separately from the knife, or together with the knife as the knife moves between the cutting position and the non-cutting position.

32. An agricultural harvester comprising a crop pick-up device, a crop receiving station and the cutter device of claim 1, wherein the cutter device is configured to transfer crop along the feed path from the crop pick-up device to the crop receiving station.

33. An agricultural harvester according to claim 32, the agricultural harvester comprising a round baler, a square baler or a loading wagon.

34. A method of accessing a knife in a cutter device for an agricultural harvester, the method including providing a cutter device comprising:

a rotor with a plurality of tines, wherein the rotor is rotatable to transfer an agricultural crop along a feed path;

a sub-assembly including:

a pivot shaft;

a knife, wherein a position of the knife is adjustable between (i) a cutting position in the feed path in which the knife cooperates with the rotor to cut the crop, and (ii) a non-cutting position in which the knife is withdrawn from the feed path, wherein the knife includes an engagement formation located towards a front end of the knife that is arranged to engage the pivot shaft;

a first bottom plate located beneath the rotor in a working condition, wherein the feed path is located between the rotor and the first bottom plate, and the first bottom plate includes an opening through which the knife extends in the cutting position;

a support frame;

a positioning device mounted to the support frame, wherein the positioning device is arranged to control movement of the knife between the cutting position and the non-cutting position, and to selectively disengage the knife to allow movement of the knife relative to the positioning device;

a control mechanism mounted to the support frame, wherein the control mechanism is arranged to control movement of the positioning device;

wherein the sub-assembly is moveably mounted to the support frame and is arranged to move relative to the support frame in a lateral direction that is transverse to a forward moving direction of the cutter device between i) a working position in which the sub-assembly is aligned with the support frame in a manner that enables the knife to be engageable by the positioning device, and ii) a maintenance position in which the knife is laterally spaced apart from the positioning device and the sub-assembly protrudes laterally outwards from the support frame;

unlocking the sub-assembly from the support frame;

sliding the sub-assembly in a lateral direction to the maintenance position, thereby locating the knife in an accessible position.

* * * * *